US006760916B2

(12) United States Patent
Holtz et al.

(10) Patent No.: US 6,760,916 B2
(45) Date of Patent: Jul. 6, 2004

(54) METHOD, SYSTEM AND COMPUTER PROGRAM PRODUCT FOR PRODUCING AND DISTRIBUTING ENHANCED MEDIA DOWNSTREAMS

(75) Inventors: Alex Holtz, Jacksonville, FL (US); William H. Couch, Fernandina Beach, FL (US); Gilberto Fres, Jacksonville, FL (US); Timothy Hamlett, Jacksonville, FL (US); Charles Hoeppner, Jacksonville, FL (US); Jeffrey L. Parker, Jacksonville, FL (US); William Robblee, Jacksonville, FL (US); Richard L. Sisisky, Jacksonville, FL (US); Robert Snyder, Jacksonville, FL (US); Keith G. Tingle, Neptune Beach, FL (US); Richard Todd, Jacksonville, FL (US); Roger Verboncoeur, Jacksonville, FL (US)

(73) Assignee: ParkerVision, Inc., Jacksonville, FL (US)

( * ) Notice: Subject to any disclaimer, the term of this patent is extended or adjusted under 35 U.S.C. 154(b) by 77 days.

(21) Appl. No.: 09/836,239

(22) Filed: Apr. 18, 2001

(65) Prior Publication Data

US 2002/0053078 A1 May 2, 2002

Related U.S. Application Data

(63) Continuation-in-part of application No. 09/634,735, filed on Aug. 8, 2000, which is a continuation-in-part of application No. 09/488,578, filed on Jan. 21, 2000, which is a continuation-in-part of application No. 09/482,683, filed on Jan. 14, 2000.

(51) Int. Cl.[7] .......................... H04N 7/10; H04N 7/025
(52) U.S. Cl. .................. 725/34; 725/1; 725/36; 725/42; 725/91; 705/10; 345/721; 345/722; 345/723; 709/217; 709/219
(58) Field of Search ................. 725/32, 34–36, 725/42, 1, 93, 91, 115, 114, 116; 705/10; 345/721–723; 709/217, 219

(56) References Cited

U.S. PATENT DOCUMENTS 5,231,499 A 7/1993 Trytko (List continued on next page.)

OTHER PUBLICATIONS

Copy of International Search Report for Appln. No. PCT/US03/14427, mailed Oct. 17, 2003, 6 pages.

Primary Examiner—Vivek Srivastava
Assistant Examiner—Ngoc Vu
(74) Attorney, Agent, or Firm—Sterne, Kessler, Goldstein & Fox PLLC

(57) ABSTRACT

A multimedia production and distribution system collects or assembles a media production (such as, a news program, television programming, or radio broadcast) from a variety of sources, including television stations and other media hosting facilities. The media production is categorized and indexed for retrieval and distribution across a wired or wireless network, such as the Internet, to any client, such as a personal computer, television, or personal digital assistant. A user can operate the client to display and interact with the media production, or select various options to customize the transmission or request a standard program. Alternatively, the user can establish a template to generate the media production automatically based on personal preferences. The media production is displayed on the client with various media enhancements to add value to the media production. Such enhancements include graphics, extended play segments, opinion research, and URLs. The enhancements also include advertisements, such as commercials, active banners, and sponsorship buttons. An advertisement reporting system monitors the sale and distribution of advertisements within the network. The advertisements are priced according to factors that measure the likelihood of an advertisement actually being presented or viewed by users most likely to purchase the advertised item or service. The advertisement reporting system also collects metrics to invoice and apportion income derived from the advertisements among the network participants, including a portal host and/or producer of the content.

96 Claims, 18 Drawing Sheets

U.S. PATENT DOCUMENTS

| | | | |
|---|---|---|---|
| 5,930,446 A | | 7/1999 | Kanda |
| 5,931,901 A | * | 8/1999 | Wolfe et al. ............... 709/206 |
| 6,011,537 A | * | 1/2000 | Slotznick ................. 345/115 |
| 6,029,045 A | * | 2/2000 | Picco et al. ................. 455/5.1 |
| 6,084,581 A | | 7/2000 | Hunt |
| 6,134,380 A | | 10/2000 | Kushizaki |
| 6,198,906 B1 | | 3/2001 | Boetje et al. |
| 6,204,840 B1 | | 3/2001 | Petelcyky et al. |
| 6,437,802 B1 | | 8/2002 | Kenny |
| 6,441,832 B1 | | 8/2002 | Tao et al. |
| 6,452,612 B1 | | 9/2002 | Holtz et al. |
| 2002/0170068 A1 | * | 11/2002 | Rafey et al. ............... 725/112 |
| 2003/0206720 A1 | * | 11/2003 | Abecassis ................. 386/83 |

* cited by examiner

METHOD, SYSTEM AND COMPUTER PROGRAM PRODUCT FOR PRODUCING AND DISTRIBUTING ENHANCED MEDIA DOWNSTREAMS

CROSS-REFERENCE TO RELATED APPLICATIONS

This application is a continuation-in-part of U.S. patent application Ser. No. 09/634,735, filed Aug. 8, 2000, by Snyder et al., entitled "System and Method for Real Time Video Production and Multicasting," (still pending); which is a continuation-in-part of U.S. patent application Ser, No. 09/488,578, filed Jan. 21, 2000, by Snyder et al., entitled "System and Method for Real Time Video Production and Multicasting," (still pending); which is an continuation-in-part of U.S. patent application Ser. No. 09/482,683, filed Jan. 14, 2000, by Holtz et al., entitled "System and Method for Real Time Video Production and Multicasting," (still pending), all of which are incorporated herein by reference.

The following United States and PCT utility patent applications have a common assignee and contain some common disclosure:

"Real Time Video Production System and Method," Ser. No. 09/215,161, by Holtz et al., filed Dec. 18, 1998, incorporated herein by reference;

"Full News Integration and Automation for a Real time Video Production System and Method," Ser. No. 60/193,452, by Holtz et al., filed Mar. 31, 2000, incorporated herein by reference;

"Interactive Tutorial System, Method and Computer Program Product for Real Time Video Production," Ser. No. 60/196,471, by Holtz et al., filed Apr. 12, 2000, incorporated herein by reference;

"System and Method For Real Time Video Production and Multicasting," Ser. No. PCT/US01/00547, by Snyder et al., filed Jan. 9, 2001, incorporated herein by reference;

"Method, System and Computer Program Product for Full News Integration and Automation in a Real Time Video Production Environment," Ser. No. 09/822,855, by Holtz et al., filed Apr. 2, 2001, incorporated herein by reference;

"Method, System and Computer Program Product for Full News Integration and Automation in a Real Time Video Production Environment," Ser. No. PCT/US01/10306, by Holtz et al., filed Apr. 2, 2001, incorporated herein by reference; and "Interactive Tutorial Method, System and Computer Program Product for Real Time Media Production," Ser. No. 09/832,923, by Holtz et al., filed Apr. 12, 2001, incorporated herein by reference.

BACKGROUND OF THE INVENTION

1. Field of the Invention

The present invention relates generally to media production, and more specifically, to distributing live or live-to-tape media productions over a communications network.

2. Related Art

The broadcast industry has experienced dramatic changes both in technology and business operations. The changes have been manifested in response to regulatory requirements for digital transmissions and competition from both traditional and nontraditional industry sectors. Traditional competitors such as cable coexist with broadcasters due to both mandated and agreed upon "must carry" rules. These rules allow local broadcast stations to access cable networks. Nontraditional transmission media provide another source of stiff competition due to the emergence of digital broadcast satellites (DBS) and Internet Service Providers (ISP).

As more and more households adapt to nontraditional transmissions, the competition for consumer attention will continue to increase. Currently, the unique advantage that broadcasters have is local origination, especially for news. However, competition continues to develop for major network (i.e., ABC®, NBC® and CBS® affiliates due to FOX®, UPN® and other startups for cable services and Internet multicasts (including webcasts). In addition, in the foreseeable future, digital transmission signals may be divided into separate channels for multicasting applications, thereby permitting major networks to step into the local origination market. In addition, newspapers, radio stations and other media hosting entities are competing for awareness and market share on the Internet. Television broadcasters are putting forth an effort to also maintain a local market share on the Internet but have yet to leverage successfully their best asset, i.e. video.

All of these issues present new obstacles that must be overcome by all broadcasters. These issues involve transitioning to digital broadcasts; leveraging automation to resolve the reallocation of resources to generate more content at lower operating expenses; creating an Internet presence to leverage video assets; multicasting to add programming diversity and revenue; using computer networking to adapt streamlined approaches for field acquisition, pre-production, editing, and on-air execution of a show; and maintaining on-air systems through system redundancy.

To increase their presence on the Internet and compete for a larger viewing audience, broadcasters have deployed various business models. Some broadcasters operate their own web sites to service the broadcasters' audience. However, proper staffing and management is critical to the successful operation of a web site. To effectively manage the web site, a broadcaster typically hires a webmaster, dedicated editorial manager, graphics personnel, journalists, editors, and web advertisement sales personnel. Nonetheless, budgetary constraints and market downturns have a propensity to encourage broadcasters to find creative ways to operate their businesses without increasing labor expenses.

To reduce operating costs, other broadcasters use third parties to manage the web site operations for the broadcaster, or make the content available over the Internet. The third parties may hire a staff of approximately three to four employees to perform web operation duties, such as writing and editing. The third parties may also take on the responsibility for selling advertisements to the local community. Although broadcasters may save labor expenses by hiring a third party, they typically demand a high percentage (e.g., fifty percent) of the revenues generated from the web operations. As a result, many broadcasters are finding the use of third parties not to be as cost effective as originally anticipated. Therefore, there is a trend to move web operations in-house to gain more control and revenue.

In addition to selecting the most cost-effective Internet business model, broadcasters are also challenged to design and provide a web site that is more likely to attract and retain a greater number of visitors. Most visitors browse sites to search for informative and entertaining media. With respect to news sites, most visitors would prefer to be able to pick and choose among a selection of different news stories.

However, web sites generally require the visitor to select a news story one-by-one. Thus, the visitor must engage in the tedious and time-consuming process of loading, buffering and viewing each news story one at a time.

Although some conventional web sites may allow a visitor to watch a previously recorded news program, such web sites do not enable the visitor to skip past a news story within the news program. Such web sites also do not allow the visitor to rearrange the order of the presentation. Moreover, such web sites tend not to provide supporting graphics or data that would enable the visitor to find more information about a particular story.

Increasing their Internet audience would enable broadcasters to improve their profit margins by collecting more advertisement revenue. However, Internet sponsors hesitate to sponsor web content without some reasonable assurance that the advertisement will be viewed by a visitor that is likely to purchase the promoted item.

Nonetheless, various pricing schemes can be deployed to sell advertisements. For example, a broadcaster can set prices based on a target audience, media content, time spot, duration of the advertisement, time of transmission, or other over-the-air broadcast criteria. Over-the-air broadcast criteria are typically used to target consumers who are most likely to purchase an advertised item. However, such criteria do not provide any assurance that an advertisement actually will be delivered to the targeted consumers.

Another pricing method would be to sell the advertisement based on client-server metrics, such as hits, downloads, click-throughs, or page views. Client-server metrics can be used to measure the quantity of consumers that actually receive an advertisement, but it is difficult to predict whether the consumer is likely to purchase the advertised item by considering client-server metrics alone.

Therefore, what is needed is a media production and distribution system and method to address the above problems.

SUMMARY OF THE INVENTION

The present invention solves the above problems by providing a method, system and computer program product for producing, distributing or tracking media or multimedia (collectively referred to as a "media production") within a worldwide communications network, such as the global Internet. In an embodiment, an enhanced media server transmits the media production over wired or wireless channels to one or more clients (such as, a personal computer, personal digital assistant, enhanced telephone, or personal television). An online user can operate the client to display and interact with the media production. The client includes a graphical user interface (GUI) that permits the user to select various options to customize the transmission or request a standard program. For example, the user has the option of selecting a live or prerecorded news program to be transmitted. The user could also select specific segments from one or more news programs, and arrange the segments to be presented in any order. Moreover, the user can stipulate the duration of the entire transmission, or specify the time to start or stop the transmission. The requested segments can be downloaded, streamed or saved to the client.

The present invention supports the production and distribution of various types of media productions and value added enhancements (collectively referred to as "enhanced multimedia"). A media production primarily includes video of news programs, television programming (such as, documentaries, situation comedies, dramas, variety shows, interviews, and the like), sporting events, concerts, infomercials, movies, video rentals, and radio broadcasts. However, the present invention can also be implemented with any other type of audio, video, graphics, text, or other media or multimedia presentation. Notwithstanding the type or form of the media production, the present invention provides methodologies or techniques to link enhancements to the media production. Such enhancements include graphics, extended play segments, polling data, opinion research requests, URLs, articles, documents, court rulings, and other information that enhances the value of the media production displayed on the client device. The enhancements also comprise of advertisements, including video or audio commercials, dynamic banners, sponsorship buttons, active media, and email promotions. Thus, advertisements can be linked to each segment of each standard or customized program so that the user when viewing the transmission also views that associated advertising.

The linked advertisements enable the present invention to be used as a profit generator for various participants involved in producing and distributing the enhanced multimedia. In other words, various pricing models are provided to sell the advertisements that are linked to the enhanced multimedia. In an embodiment, the advertisements are priced and linked by over-the-air broadcast criteria that are used to target consumers most likely to purchase an advertised item. Over-the-air broadcast criteria include target audience, media content, time spot, duration of the advertisement, time of transmission, and the like. In another embodiment, the advertisements are priced by client-server metrics, such as hits, downloads, click-throughs, page views, or other measurements. Client-server metrics are used to measure the quantity of consumers that actually receive an advertisement.

In another embodiment of the present invention, the pricing models are based on a combination of over-the-air broadcast criteria and client-server metrics. These factors are combined to create varying degrees of certainty that a sponsored advertisement actually would be presented, received or viewed by the greatest quantity of users most likely to purchase the advertised item or service.

The degree of certainty is directly proportional to the price of the sponsored advertisement. Therefore, the present invention provides a fair and equitable methodology for pricing an advertisement based on consumer demand and behavioral patterns.

The present invention includes a tracking and reporting system that monitors the distribution of linked advertisements and prepares an invoice based on the selected pricing model. Revenue generated from the selected pricing model is apportioned among the network participants. The network participants include (1) the television stations or other media hosting facilities which create or provide the media production, (2) the operator of the portal hosting the web page that permits the user to request the media production, and (3) other participants in the network.

The present invention supports the integration of media productions from various sources. In an embodiment, a live media production (e.g., news programming) is recorded at a local (or national) station, segmented, categorized, and indexed for easy retrieval and viewing. These operations can be performed automatically using the PVTV Production Automation System (previously referred to as the Camera-ManSTUDIO™ automation system) available from ParkerVision, Inc. of Jacksonville, Fla. Alternatively, these operations can be performed manually. An index is then established using these categories so that individuals can easily query the index and select the news segments they want to view. Alternatively, the user can set up a template so that a news program is automatically generated based on personal preference. The news program is then compiled, potentially with advertisements, and downloaded to the user's display device.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

FIG. 8 illustrates an encode object configuration GUI according to an embodiment of the present invention.

FIG. 17 illustrates rundown GUI for a news automation system according to an embodiment of the present invention.

DETAILED DESCRIPTION OF THE INVENTION

Table of Contents

Figure 1:
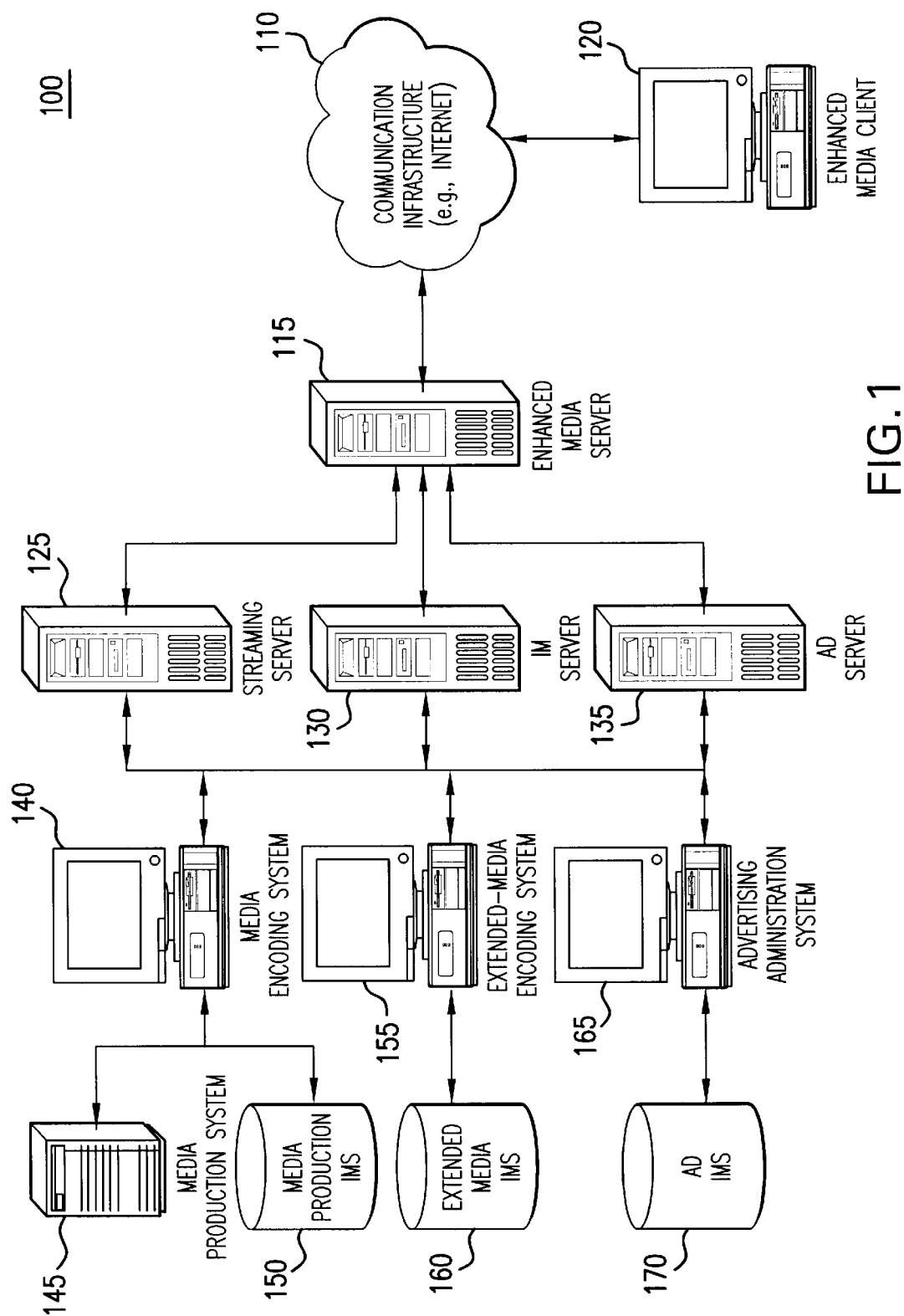
FIG. 1 illustrates an enhanced media production and distribution system according to an embodiment of the present invention.

I. Introduction
  1. Overview of Webcast Portal
  2. Aspects of the Invention
  3. Implementation Example
  4. Benefit of Invention Using an Example Conventional Webcast Model
II. Content Production and Storage
  1. Suppliers
    1.1. Manual Media Production
    1.2. Automated Media Production
    1.3. Radio Broadcasts
  2. Content Archival and Retrieval
III. Webcast Production
  1. Operational Description
  2. System Features
    2.1. Customizable Downstreams
    2.2. Continuous Play Mode
    2.3. Seamless Transmissions
    2.4. Automatic Record and Playback
    2.5. Online User Archives
  3. Media Enhancement & Webcast Synchronization
    3.1. Advertisement
    3.2. Auxiliary Information
    3.3. Extended Audio-Video
    3.4. Opinion Research
    3.5. Hyperlinks to Related Sites
    3.6. Methods of Entering Media Enhancements
IV. Viewer Interface
  1. Media Viewer
  2. Viewer Controls
  3. Media Index
  4. Auxiliary Media
  5. Opinion Data
  6. Media Access Area
  7. Advertisement Banner
  8. Alternative Skins
V. Advertisement Revenue Generation
  1. Download Metrics
  2. Subscription Services
  3. Distribution Schemes
    3.1. Local Distribution
    3.2. Regional Distribution
    3.3. E-commerce
    3.4. Education
VI. Conclusion I. Introduction The present invention allows an individual to view a real time or customized media production, which is transmitted over a network (e.g., the World Wide Web), onto their personal computer (PC), personal digital assistant (PDA) or other display device. The media productions primarily include video of news programs, television programming (such as, documentaries, situation comedies, dramas, variety shows, interviews, and the like), sporting events, concerts, infomercials, movies, video rentals, and the like. Media productions also include live or recorded audio (including radio broadcast), graphics, text, and other forms of media and multimedia.

In an embodiment, a live news programming is recorded at a local (or national) station, segmented, categorized, and indexed for easy retrieval and viewing. These operations can be performed automatically using the PVTV Production Automation System (previously referred to as the Camera-ManSTUDIO™ automation system) available from ParkerVision, Inc. of Jacksonville, Fla. Alternatively, these operations can be performed manually. For example, a thirty minute news program is broken up into separate topics, including national news, local news, sports, weather, business, and the like. These news topics are segmented and appropriately categorized (e.g., sports can be categorized to football or Jacksonville Jaguars). An index is then established using these categories so that individuals can easily query the index and select the news segments they want to view. Alternatively, the user can set up a template so that a news program is automatically generated based on personal preference. The news program is then compiled, potentially with advertisements, and downloaded to the user's display device.

It is contemplated that the present invention can be used as a profit generator for each of the participants within the network. Advertisements can be focused based on which news segments are downloaded to the user. Advertising is linked to each segment of each customized program so that the user when viewing the customized programming also views that associated advertising. The television stations providing the segments making up the customized programming share in the revenue from the advertising with the portal where the users go to receive the customized programming and with other participants in network. In this way, the present invention creates a television network on the World Wide Web which provides each user with customized programs on demand, and compensates through shared advertising revenue to (1) the television stations which provide the segments which are used in the customized program, (2) the operator of the portal where the users go on the World Wide Web and which causes the customized programs to be assembled and broadcast on demand, and (3) other participants in the network.

1. Overview of Enhanced Media Production and Distribution

FIG. 1 illustrates a block diagram of an enhanced media production and distribution system 100 (herein referred to as "system 100") according to an embodiment of the present invention. As used herein, the term "media production" includes the production of all forms of media or multimedia in accordance with the system and method of the present invention. Additionally, the term "enhanced media" refers to a media production that has been augmented according to the present invention to enhance the value of the media production by associating auxiliary information, such as graphics, extended play segments, opinion research data, URLs, advertisements, and the like.

System 100 includes an enhanced media server 115 and one or more enhanced media clients 120. In an embodiment, enhanced media server 115 provides web pages for a hosting portal, homepage or web site. The operator of the portal can be a local television, radio station, newspaper, webcasting station, or other media "hosting" environment.

A communication infrastructure 110 provides a medium for communication among enhanced media server 115 and enhanced media clients 120. Communication infrastructure 110 includes wired or wireless local area networks (LAN) or wide area networks (WAN), such as an organization's intranet, local internets, the global-based Internet (including the World Wide Web (WWW)), virtual private networks, or the like. Communication infrastructure 110 includes wired, wireless, or both transmission media, including satellite, terrestrial (e.g., fiber optic, copper, coaxial, hybrid fiber-coaxial (HFC), and the like), radio, microwave, and any other form or method of transmission.

Each enhanced media client 120 is a personal computer, personal digital assistant (PDA), telephone, television, MP3 player, or other device operable for wired or wireless exchanges over communication infrastructure 110. Enhanced media clients 120 include a display having the ability to select one or more media segments. In an embodiment, enhanced media client 120 is located in an automobile, and can be a MP3 stereo or personal computer with a hard drive and capable of downloading music or music video files. Moreover, the user of an enhanced media client 120 includes human operators requesting a web page from enhanced media server 115 over the Internet, or another web site host, television or radio broadcaster, and the like.

In an embodiment, enhanced media server 115 transmits, to enhanced media clients 120, media streams formatted to support multimedia applications available from RealNetworks, Inc. (Seattle, Wash.), Microsoft Corporation (Redmond, Wash.), and Apple Computer, Inc. (Cupertino, Calif.), or like applications as would be apparent to one skilled in the relevant art(s). In addition to the aforementioned proprietary formats, the media stream formats can include, but are not limited to, MPEG-2 and MPEG-4 non-proprietary formats.

Enhanced media server 115 is connected to a streaming server 125, information management (IM) server 130 and advertisement server 135. Streaming server 125 supports live and on-demand streaming functionality of system 100. Streaming server 125 transmits media streams by interacting with media encoding system 140, media production system 145, media production information management system (IMS) 150, extended-media encoding system 155 and extended-media IMS 160. Streaming server 125 and enhanced media server 115 are configurable to provide continuous, seamless streams for real-time or near-term presentations, as well as download data files to enhanced media client 120 for delayed playback. The media streams can either be continuous as represented by a complete show broadcast over the airwaves, or modified according to the interests of the user of enhanced media client 120, reassembled and streamed in the new configuration. In either case, the streaming process only requires a single download, buffering and playout process.

In an embodiment, the media streams of system 100 are formatted to support the Windows Media™ player application available from Microsoft Corporation. To better understand media streams of system 100, an understanding of this format must first be explained. The metafiles of the Windows Media™ application are text files that act as links from web pages to content formatted to support the Windows Media™ application on a server, such as enhanced media server 115. The basic purpose of a metafile is to redirect streaming media content away from browsers, which in most cases are not capable of rendering the content, to an application such as the Windows Media™ player application. The metafiles of the Windows Media™ application have a .wvx, .wax or .asx extension. When a browser downloads a file with one of these extensions from a web site, the browser opens a Windows Media™ player application. The Windows Media™ application would then locate and play the content specified in the file.

A metafile for a Windows Media™ application contains a type of Extensible Markup Language (XML) scripting that can only be interpreted by a Windows Media™ application. A metafile script can be as simple or complex as needed. The most basic metafile contains the Uniform Resource Locator (URL) of multimedia content on a server. A complex metafile can contain multiple files or streams arranged in a playlist, instructions for playing the files or streams, text and graphic elements associated with the video and topic being streamed, and hyperlinks associated with the elements as they are displayed by the Windows Media™ application.

Enhanced media client 120 is configured with a "viewer," such as media viewer 1102 described below in reference to FIG. 11. The viewer can be updated by instructing the enhanced media client 120 to download a new revised viewer. The user can build a show via the viewer and a request is made for a metafile with an ASX file extension. As described, an ASX metafile references the Windows Media™ application-formatted file, such as the Windows Media™ Video (WMV) file. The ASX metafile is a list of all of the files/stories requested, including video advertisements. Show segments assembled and requested by the viewer are sent to IM server 130 via enhanced media server 115. The viewer gets back an ASX play list that includes, for example, an introduction video, advertisement videos and story videos. The ASX file plays the multiple WMV files or like formats. Each file would represent a story or segment that contains all content and associated links.

Although the user operating an enhanced media client 120 only experiences a single download, buffering process and playout, the system and method of the present invention actually provides multiple files in the requested order to be played in a seamless or near seamless manner. This is achieved by the development of a video fragmentation technique, discussed in detail below in reference to FIG. 10. In other words, enhanced media server 115 would query streaming server 125 to assemble an entire media production based on the segments requested by enhanced media client 120. The media production would be fragmented such that a portion of the media production could be sent downstream to enhanced media client 120 to be buffered for playout. As the buffer is emptied for display, an additional media stream would be sent to the buffer such that the enhanced media client 120 could create a seamless or near seamless display.

IM server 130 is an indexing system that enables the other system components to query system 100 for data and metadata. For example, enhanced media server 115 is operable to query IM server 130 for the location or filename of a specific video segment. The query results from IM server 130 are communicated to streaming server 125 which, in turn, locates the requested video segment for transmission to the requesting client.

Finally, advertisement server 135 is connected to an advertising administration system 165 and an advertisement (AD) IMS 170. Advertisement server 135 provides advertisements (such as, commercials in audio or video format, banners, active media, and the like) that are integrated into a media stream (e.g., video segment) requested by an online user. As described in detail below, advertisements can be requested by any of the other system components and integrated into a media stream at any point in the media production process.

Enhanced media server 115 commands and controls the operational capabilities of system 100. As a result, enhanced media server 115 functions as a portal to process or service requests for media produced or archived within system 100. Enhanced media server 115 also implements policies and rules to enforce security protocols to protect system and data integrity, including user authentication, user roles, and the like.

In an embodiment, enhanced media server 115 or at least one of its supporting system components (i.e., streaming server 125, IM server 130, advertisement server 135, media encoding system 140, media production system 145, etc.) is located at the facilities of a local television, radio station, newspaper, webcasting station, or other media hosting environment. However, enhanced media server 115 or at least one of its supporting system components can also be remotely located and configured to communicate with a television or radio station functioning as a content source. In other embodiments, enhanced media server 115 or at least one of its supporting system components are locally or remotely positioned at a private residence, place of business, educational institution, government agency, or the like, and utilized for media production and network distribution.

Figure 2:
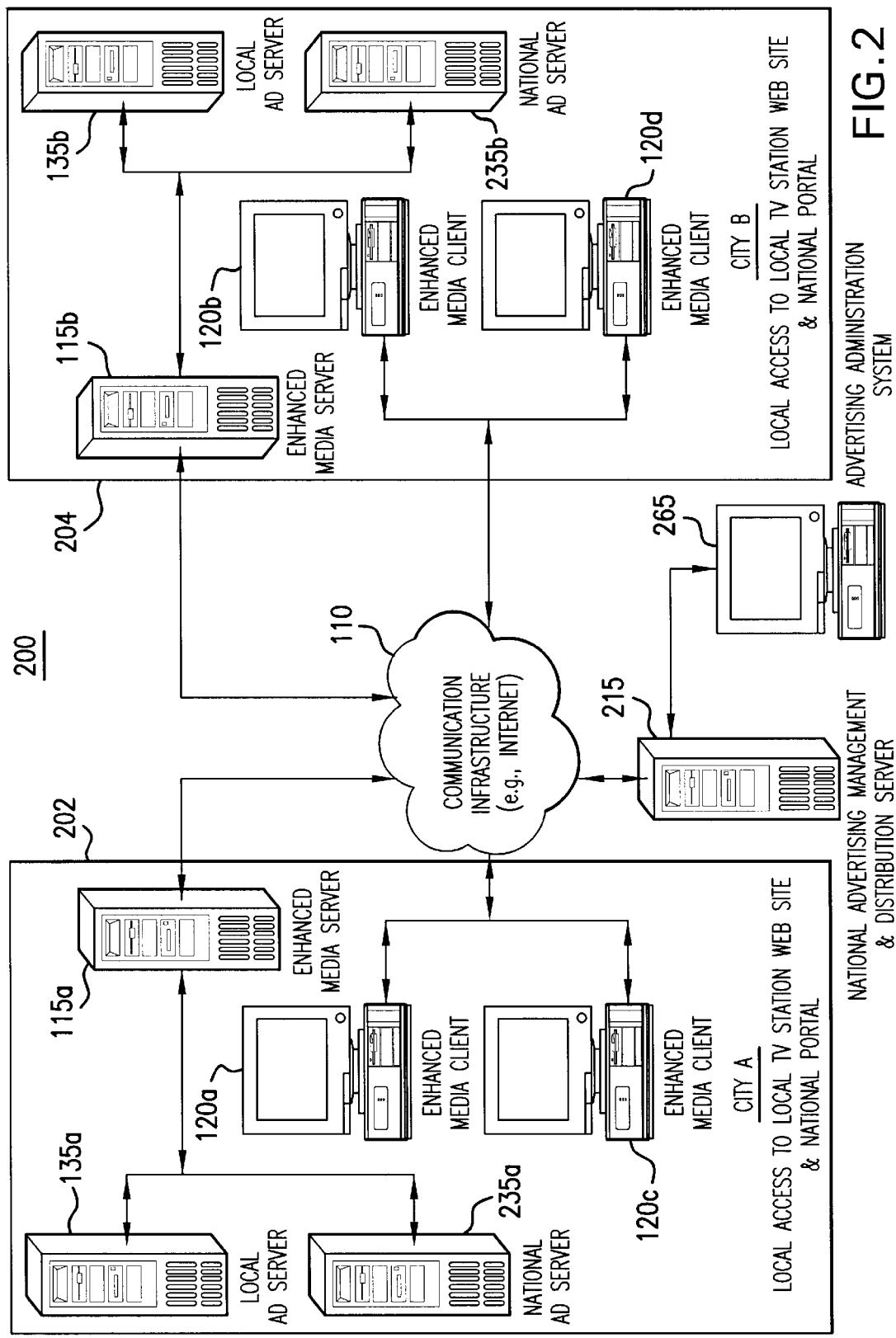
FIG. 2 illustrates a national media management and distribution system according to an embodiment of the present invention.

In another embodiment of the present invention, a centralized advertising management and distribution server manages a plurality of AD servers 135. FIG. 2 illustrates a block diagram of a national advertising management and distribution system 200 (herein referred to as "system 200") according to an embodiment of the present invention. System 200 includes a national advertising management and distribution server 215 (herein referred to as "managing server 215") and an advertising administration system 265. Managing server 215 provides centralized control of advertisement distribution within and among region 202 and region 204. In an embodiment, managing server 215 hosts advertising management for an internet service provider (ISP), such as AOL, AT&T, Starpower, Verizon, and the like. In another embodiment, managing server 215 host advertising management for an information service provider that offers information content, such as news, entertainment, travel, history, art, business, education, science, health, recreation, careers, and the like. An information service provider primarily hosts a national portal operating over the Internet, such as AOL, MSN, Yahoo, Alta Vista, Excite, and the like. An information service provider also include web sites operated by major networks (such as, CNN, MSNBC), local broadcasting networks, private/personal web sites or homepages, and the like.

Although only two regions are described for illustrative purposes, system 200 is scalable to support multiple regions. Moreover, a region is representative of a city, county, state, province, country, group of countries, time zone, or the like. A region is not restricted to geographic boundaries, but can represent priority or class assignments for enhanced media clients 120*a*–120*d* or for the services provided by enhanced media servers 115*a*–115*b*, and the like. Each region can include multiple enhanced media servers 115*a*–115*b*, with each being hosted by a television broadcaster, newspaper, radio station, webcaster or other media hosting facilities.

Communication infrastructure 110 provides a medium for exchanging communications among managing server 215, region 202 and region 204. Within each of region 202 and region 204, one or more enhanced media clients 120*a*–120*b* are operable to interact with local or remote enhanced media servers 115*a*–115*b*. Thus, as described above, enhanced media servers 115*a*–115*b* are portals to media hosting facilities.

For example, a user located in region 204 could operate enhanced media client 120*b* to request information from a web site hosted by a local or remote television station by querying enhanced media server 115*a* over the World Wide Web (shown as communication infrastructure 110). Additionally, should the user travel from region 204 to region 202 using a portable embodiment of enhanced media client 120*b*, the user would still be able to query locally and remotely positioned enhanced media servers 115*a*–115*b* over an Internet connection (shown as communication infrastructure 110).

In an embodiment, each enhanced media server 115*a*–115*b* includes a respective local advertisement server 135a–135b and national advertisement server 235a–235b. Each enhanced media server 115a–115b is also connected to other supporting system components (i.e., a streaming server 125, IM server 130, media encoding system 140, etc.), as discussed in reference to FIG. 1.

In an embodiment, managing server 215 sends File Transfer Protocol (FTP) advertisement files to all national advertisement servers 235a–235b. Advertising administration system 265 synchronizes or polls the respective AD IMS 170 for each enhanced media server 115a–115b to obtain statistical and status updates that report the advertisements served, including demographic and other metric data, as described in detail below. In an embodiment, the advertisements residing on national advertisement servers 235a–235b are served in open advertising spots to the local enhanced media clients 120a–120b. Open advertising spots are defined by locations or time slots which are not sold locally by show, show segment, topic, or the like. Priorities can be set to determine local versus national, along with cost per thousand (CPM) downloads.

In another embodiment, when managing server 215 is managed by a national ISP or national information service provider, enhanced media servers 115a–115b would serve multiple branded viewers (as discussed below in reference to FIGS. 11–13) depending on the origin of the request from enhanced media clients 120a–120d. As an example, if enhanced media client 120a makes a request through a local ISP, enhanced media server 115a would serve a locally branded viewer. If, for example, enhanced media client 120c makes a request as a subscriber to a national ISP (such as AOL), enhanced media server 115a would serve an AOL-branded viewer. In this embodiment, national advertisements sold by the national ISP (i.e., AOL) would be stored and served from national advertisement server 235a from the files sent from managing server 215. Advertisements sold locally would be served from local advertisement server 135a to the respective enhanced media client 120a and enhanced media client 120c. In an embodiment, local or national advertisements from local advertisement server 135a or national advertisement server 235a, respectively, are served to either local ISP-based enhanced media client 120a or national ISP-based enhanced media client 120c, if advertising positions are not sold.

2. Aspects of the Invention

The present invention offers significant features, functions, operations and outputs that cannot be provided by conventional media production or webcasting technologies. For instance, media production system 145 allows for the automated production of television shows, such as news programs, using many fewer people than is presently required in conventional television studios. Additionally, media encoding system 140 allows for the television program output from media production system 145 to be tagged, partitioned and organized automatically so that it can be broadcast over communication infrastructure 110 in a highly automated fashion.

Hence, the method and system of the present invention combines automated media production, webcasting and additional technology to achieve a delivery system that is operable to stream various forms of media over, for example, the World Wide Web where each user (i.e., enhanced media client 120) receives live or customized programming on demand. Advertising is linked to each segment of each customized program so that the user when viewing the customized programming also views the associated advertising. The hosting facilities (e.g., television station) providing the segments making up the customized programming share in the revenue from the advertising with the portal operator (if different from the hosting facility) where the users go to receive the customized programming and with other participants in network. In this way, the present invention creates, for example, a television network on the World Wide Web that provides each user with customized programs on demand, and compensates through shared advertising revenue to (1) the television stations which provide the segments which are used in the customized programs to be assembled and broadcast on demand, (2) the operator of the portal where the users go on the World Wide Web for access to local content, and (3) other participants in the network.

Hosting facilities using an automated media production system 145 to produce television programs automatically tag, partition and organize each program for use in the present invention. Each program is automatically divided into segments corresponding to the subject matter of that segment. The advertising for each program is linked to each subject matter segment of the program. Categories can be defined with multiple cascading granularity such as: DATE SHOW AIRED, SPECIFIC SHOW BY TITLE, SPORTS SEGMENT, FOOTBALL CATEGORY, PROFESSIONAL FOOTBALL SUB-CATEGORY, JACKSONVILLE JAGUAR FOOTBALL SUB-CATEGORY. This example demonstrates six levels for topic and advertising resolution and targeting. Alternatively, each subject matter segment can be linked only to one or more of the advertisements for the program according to a specified schedule. Because each program is automatically segmented according to subject matter, a television station, for example, does not incur additional cost in providing the television content to the portal. Instead, the segments with linked advertisements are produced automatically along with the television program itself.

A portal on the World Wide Web acts as the site where users go to receive a live or customized program on demand. Hosting facilities for each enhanced media server 115 of the present invention are connected to the portal over the World Wide Web. Since the portal receives additional users because of the availability of live local content and on-demand customized television programming, it receives additional traffic, which creates additional sources of revenue and increased advertising.

The portal acts as a passage for accessing the contents of the selected enhanced media server 115 and other system components (i.e., streaming server 125, IM server 130, AD server 135, etc.). Enhanced media server 115 executes the request from enhanced media client 120 and in real time, assembles and streams over the World Wide Web each customized program for each user. The portal acting only as a passage to the contents of the selected enhanced media server 115 and other system components obtains, from the hosting facility, segments which have content corresponding to the subject matter specified by each user. The content is presented on a media viewer (such as, media viewer 1102 described below in reference to FIG. 11) launched by enhanced media server 115 and branded according to the portal making the request. The viewer uses these segments with linked advertisements to assemble and display in real time a live presentation or customized program.

From the user's perspective, the customized program appears seamless. The user is provided with the customized program as soon as the user indicates that the program is to start. The segments, which make up the customized program, are automatically sequenced together with the linked advertisements in such a fashion that the program appears to have been created for the user according to a subject matter specification indicated by the user.

The user specifies the desired content of the customized program by using subject matter specifications. These specifications define the desired subject matter, the geographical source of the subject matter, the creation time and date of the subject matter, when the program is to begin and how long it is to last, and other user defined parameters. A menu format can be used by the viewer to assist the user in defining the specifications. Alternately, the viewer can provide predefined specifications, or can allow the user to upload specifications generated by a program or database search engine. Profiles can be generated automatically or manually. An automatic profile allows the broadcaster (e.g., using AD IMS 170) to accumulate demographic and metric data for the sale of advertising, and the definition and scheduling of programming. This is performed automatically by the use of cookies, or similar user identifiers, loaded onto enhanced media client 120. Each time enhanced media server 115 is accessed, data is captured and stored to develop a profile of the user. Every time the same enhanced media client 120 logs onto enhanced media server 115, enhanced media client 120 receives a customized preprogrammed show according to the user's profile. The user then has the ability to accept or reject the pre-defined customized show. A modified or a totally brand new show also can be requested and assembled. Alternatively, system 100 also allows enhanced media client 120 users to complete a user profile with more detailed information. System 100 allows the broadcaster to offer an incentive and password protection for the purpose of obtaining profile data from the user.

The advertiser would purchase advertisement spots based on the provisioning of each advertisement. The present invention includes methodologies for reporting to a hosting facility the number of segments broadcast for each advertisement linked to segments provided by the hosting facility to the online users. Thus the advertiser only pays for advertisements that a enhanced media server 115 sends to a specific user.

The present invention provides a method and system for sharing the advertising revenues among the hosting facilities and other network participants. This sharing of advertising revenue is based on actual provisioning of segments with specifically linked advertisements. Since each network participant shares the advertising revenue based on actual presentations to online users, the split is equitable and driven by market demand. Each network participant obtains an additional revenue stream over the revenue generated from conventional media production and distribution systems. In this way, the present invention enables network participants to increase their revenues for relatively little additional incremental costs, making the present invention a significant profit generator.

3. Implementation Example

FIG. 1 and FIG. 2 represent conceptual illustrations of system 100 and system 200, respectively, to allow an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

In an embodiment, each server within system 100 and system 200 represents one or more computers providing various shared resources with each other and to the other network computers. In another embodiment, the servers in system 100 represent the same computer providing various shared resources to the other network computers (e.g., enhanced media client 120). In another embodiment, server 215 and one of servers 115a–115b represent the same computer providing shared resources. As apparent to one ordinarily skilled in the relevant art(s), other system components of system 100 and system 200 can be combined or separated, and are considered to be within the scope of the present invention.

The shared resources include files for programs, web pages, databases and libraries; output devices, such as, printers, plotters, display monitors and facsimile machines; and communications devices, such as modems and Internet access facilities. The communications devices can support wired or wireless communications, including satellite, terrestrial (fiber optic, copper, coaxial, and the like), radio, microwave and any other form or method of transmission.

Each server is configured to support the standard Internet Protocol (IP) developed to govern communications over public and private Internet backbones. The protocol is defined in Internet Standard (STD) 5, Request for Comments (RFC) 791 (Internet Architecture Board). The servers can also support transport protocols, such as, Transmission Control Protocol (TCP), User Datagram Protocol (UDP) and Real Time Transport Protocol (RTP). The transport protocols support various types of data transmission standards, such as File Transfer Protocol (FTP), Hypertext Transfer Protocol (HTTP), Simple Network Management Protocol (SNMP), Network Time Protocol (NTP), and the like.

Each server is also configured to support various operating systems, such as, the Netware™ operating system available from Novell, Inc. (Provo, Utah); the MS-DOS®, Windows NT® and Windows® 3.xx/95/98/2000 operating systems available from Microsoft Corporation; the Linux® operating system available from Linux Online Inc. (Laurel, Md.); the Solaris™ operating system available from Sun Microsystems, Inc. (Palo Alto, Calif.); and the like as would be apparent to one skilled in the relevant art(s).

Additionally, the present invention (e.g., system 100, system 200, or any part thereof) can be implemented in one or more computer systems or other processing systems. In fact, in one embodiment, the invention is directed toward one or more computer systems capable of carrying out the functionality described herein.

Figure 3:
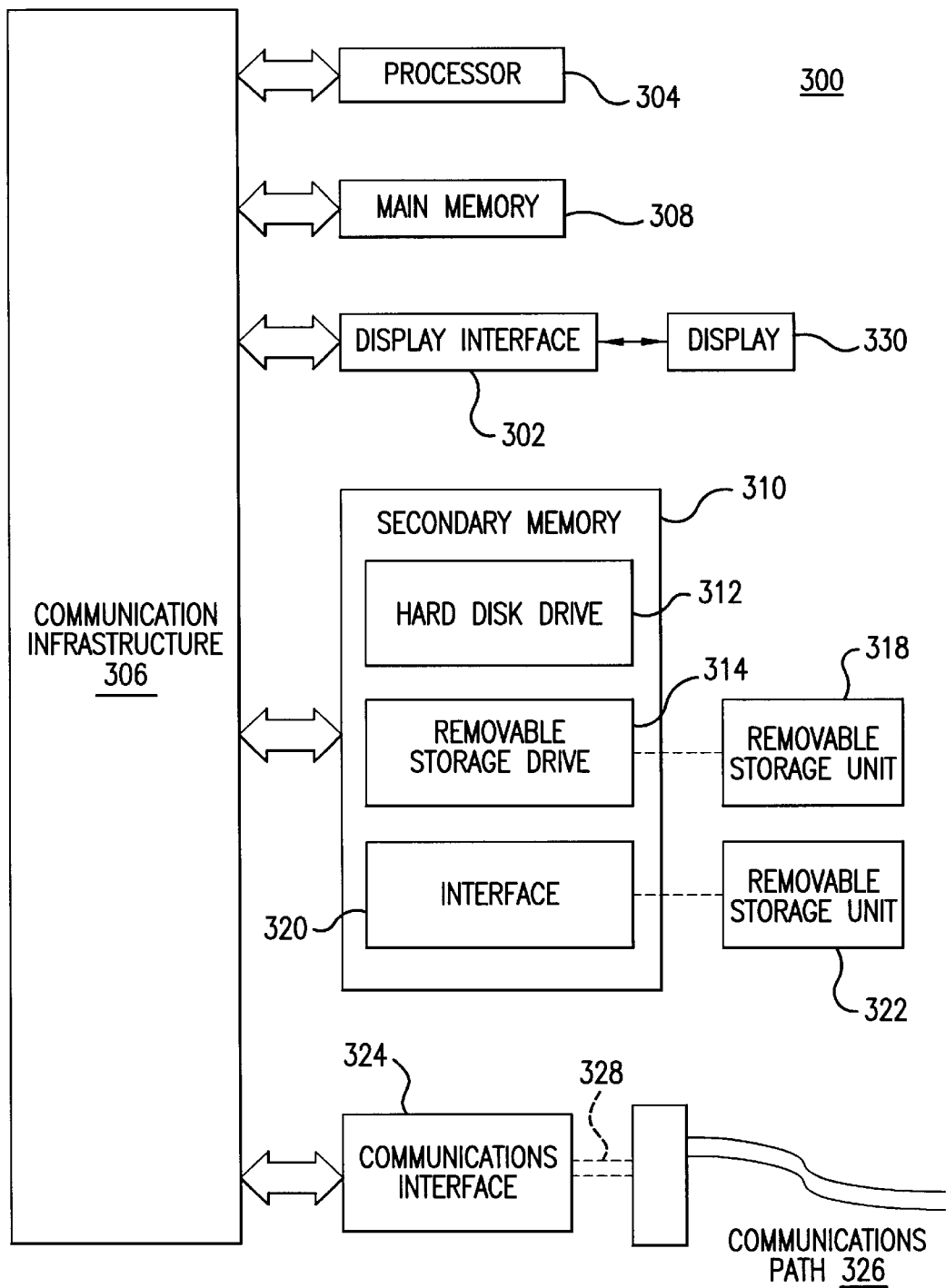
FIG. 3 illustrates a block diagram of an example computer system useful for implementing the present invention.

Referring to FIG. 3, an example computer system 300 useful in implementing the present invention is shown. The computer system 300 includes one or more processors, such as processor 304. The processor 304 is connected to a communication infrastructure 306 (e.g., a communications bus, crossover bar, or network). Various software embodiments are described in terms of this exemplary computer system. After reading this description, it will become apparent to a person skilled in the relevant art(s) how to implement the invention using other computer systems and/or computer architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and can also include a secondary memory 310.

The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner.

Removable storage unit 318, represents a floppy disk, magnetic tape, optical disk, etc. which is read by and written to removable storage drive 314. As will be appreciated, the removable storage unit 318 includes a computer usable storage medium having stored therein computer software and/or data.

In alternative embodiments, secondary memory 310 can include other similar means for allowing computer programs or other instructions to be loaded into computer system 300. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals 328 which can be electronic, electromagnetic, optical or other signals capable of being received by communications interface 324. These signals 328 are provided to communications interface 324 via a communications path (i.e., channel) 326. This channel 326 carries signals 328 and can be implemented using wire or cable, fiber optics, a phone line, a cellular phone link, an RF link and other communications channels.

In this document, the terms "computer program medium" and "computer usable medium" are used to generally refer to media such as removable storage drive 314, a hard disk installed in hard disk drive 312, and signals 328. These computer program products are means for providing software to computer system 300. The invention is directed to such computer program products.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software can be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

4. Benefit of Invention Using an Example Conventional Webcast Model

An example of the operation of the present invention is illustrative. Suppose a user wants to follow the progress of his college sports team. For purposes of illustration only, suppose the team is the Creighton basketball team. However, the user has moved from Iowa to Florida, where the local and national television stations do not provide any coverage of this team unless it is going to a major championship. In addition, the user works extensive hours which makes his opportunities to watch television variable. He also wants to focus his television viewing to specific content programs because of his very limited available television viewing time.

The user logs onto a site hosted by enhanced media server 115 and indicates that he wants to watch a customized program on the Creighton basketball team. To do this, the user can either specify all of the necessary program parameters for this specific program, or he can evoke a stored program profile and customize it for the specific parameters needed for this customized program. Suppose, the user has indicated to the portal that he wants segments from the Iowa and Nebraska local stations first. He also indicates that he wants segments from the Creighton college webcast station. He indicates that he wants programs starting with the most recent and going back in time twelve hours. He also indicates that he wants his customized program to be twenty-five minutes long, but that he may want to extend fifteen minutes if additional segments are available and he is still available. Finally, he indicates that he wants the customized program to begin exactly at 9:35 A.M. EST, which is seven minutes after he has inputted all of his specifications to enhanced media server 115.

Enhanced media server 115 would acknowledge receipt to the user of all of the necessary specifications. During the time preceding the start of the customized program (i.e., 9:35 A.M. EST), enhanced media server 115 provides the user with advertisements. As this is going on, enhanced media server 115 begins a search for appropriate segments from each of the hosting media facilities (i.e., local and national television stations) according to the geographical parameters specified by the user. The assembly time varies depending on numerous factors, such as number of requested segments, geographic source of the segments, bandwidth availability, time of day, etc. The media production can be assembled for immediate transmission or delayed, as in this example, the user requested the media production to begin at a certain time (i.e., 9:35 A.M. EST).

Enhanced media server 115 assembles these segments and orders them according to the program specifications. Upon completion of the advertisements, the user begins receiving the customized program, which is made up of segments and additional advertisements. Suppose the first segment is a thirty-second segment on the team, which had just been broadcast by local station 1 in the Des Moines area. Along with it is a fifteen-second advertisement. The second segment is a forty-five-second segment on the team that had been broadcast thirty-five minutes earlier by local station 2 in the Sioux City area. It also has a short advertisement. The third segment is a six-minute interview of the coach, which ran four hours before on the Creighton University webcast station. Along with it is a two-minute alumni promo featuring information for contributions to the sports program. In this manner, the customized program proceeds until it is completed or the user logs off enhanced media server 115. This is an example of a user requesting content from various sources on a network throughout the country. In another example, benefit can be derived by a local user requesting content from a local broadcaster. In this example, the user can either scan the menu items on a client viewer by date, specific show, show topics, categories within topics, sub-categories within categories or keyword search.

Figure 15:
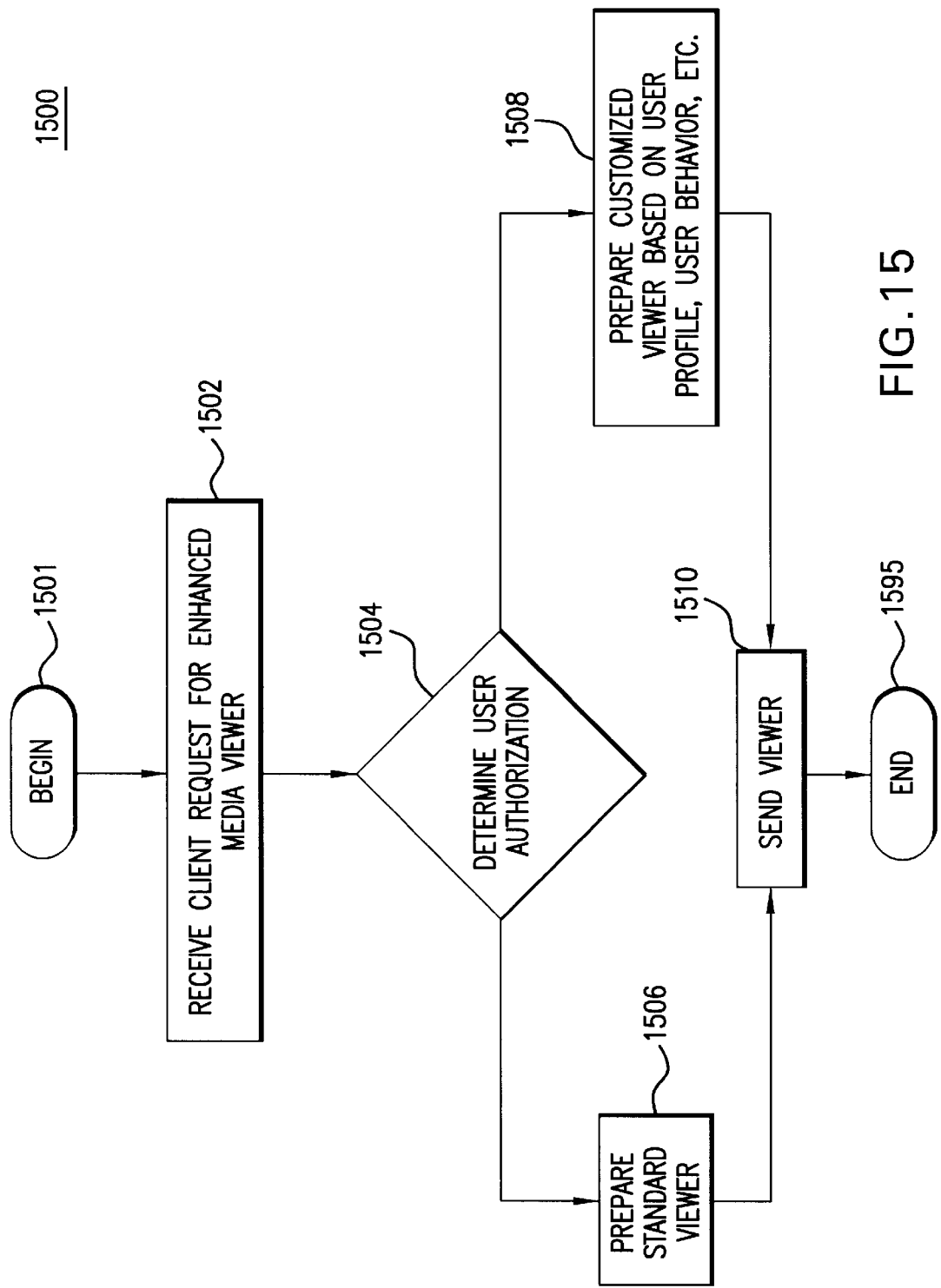
FIG. 15 illustrates an operational flow diagram for the steps involved in providing an enhanced media viewer according to an embodiment of the present invention.

Referring to FIG. 15, flowchart 1500 represents the general operational flow of an embodiment of the present invention. More specifically, flowchart 1500 shows an example of a control flow for providing an enhanced media viewer according to the present invention.

The control flow of flowchart 1500 begins at step 1501 and passes immediately to step 1502. At step 1502, a user operates an enhanced media client 120 to gain access to a web site hosted by enhanced media server 115. Enhanced media server 115 delivers a web page (not shown) that provides various data disseminated by the hosting facility. In an embodiment, an icon resides on the web page that allows the user to request a media production that would be assembled according to the methods of the present invention. Activating the icon sends the request to enhanced media server 115. As apparent to one ordinarily skilled in the relevant art(s), other methods can be used to send a request to enhanced media server 115 for a media production, such as sending a URL address; activating hyperlinks, hypertext, or hot spots; and the like.

At step 1504, enhanced media server 115 analyzes the client request to identify or authenticate the user. Usernames, password, user profiles, cookies and similar identification methods can be used to identify the user. The first time a user sends a request for a media production (or if specified in the user profile), the control flow passes to step 1506. At step 1506, enhanced media server 115 prepares a standard viewer (such as, media viewer 1102 described below in reference to FIG. 11). The standard viewer would include a standardized listing of available media selections (e.g., news stories) displayed in a menu format (such as, media index 1104 described below in reference to FIG. 11).

If, however, the user has established a profile for customized programming, the control flow would pass from step 1504 to step 1508. At step 1508, enhanced media server 115 prepares a customized viewer (such as, media viewer 1102) that would include a customized listing of available media selections (shown in media index 1104). The customized listing would identify, for example, news stories specified in the user profile. In an embodiment, the user would register and complete profile that specifies preferred topics or categories of interest. The user can specify other parameters, such as the duration of a customized program, start or end time, geographic source of the content, and the like. In another embodiment, the present invention queries search engines, inference engines and the like to extract user preferences from past behavior or demographics.

At step 1510, enhanced media server 115 sends the viewer to be displayed by the enhanced media client 120. Notwithstanding the receipt of a standard or customized viewer, the user can opt to switch to different viewer or change the customization parameters. As described in reference to FIG. 11, index button 1118 is provided in an embodiment to allow the user to toggle between a standard or customized listing of media selections. Upon receipt of the viewer, the control flow ends as indicated at step 1595.

Figure 16:
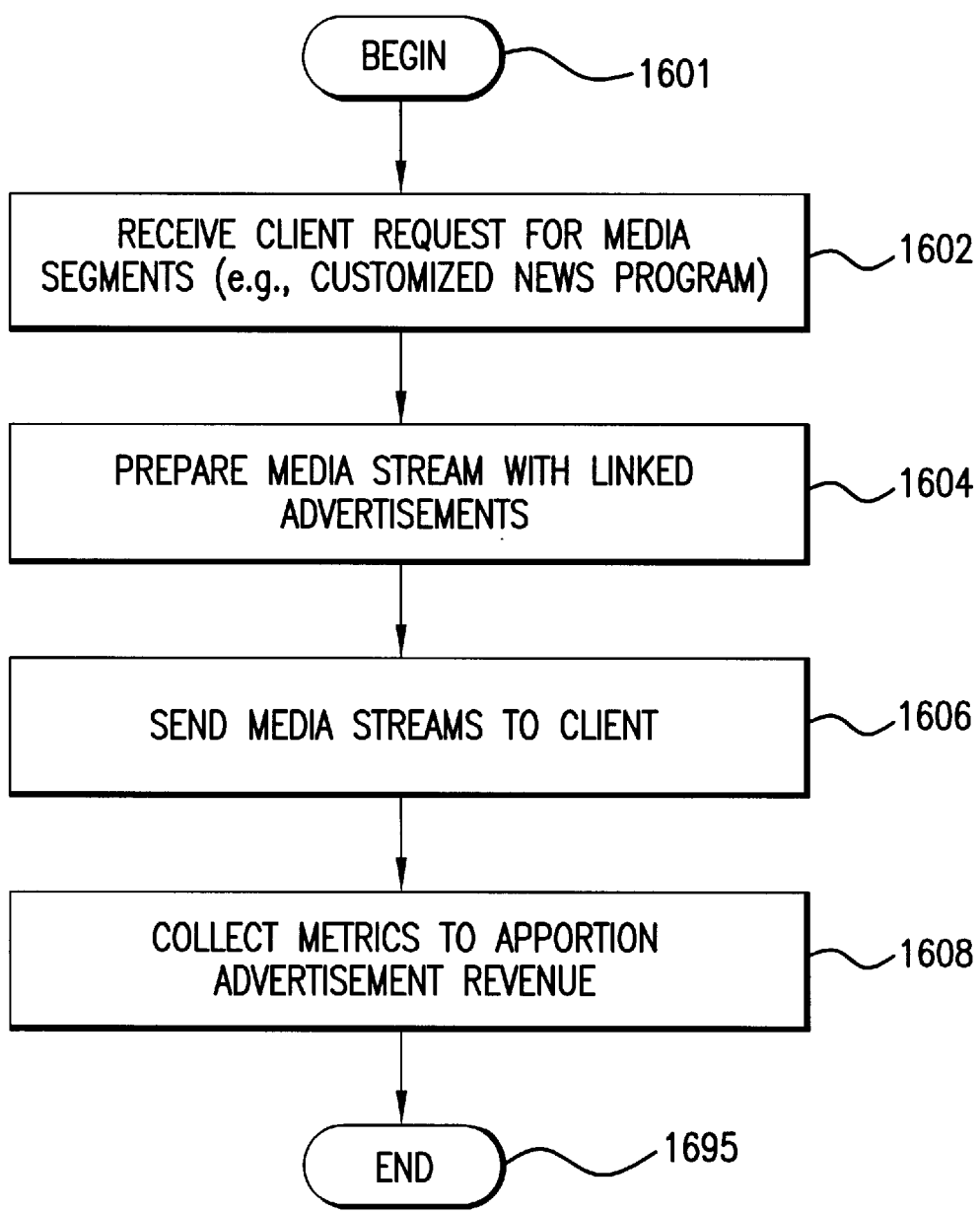
FIG. 16 illustrates an operational flow diagram for the steps involved in distributing and tracking enhanced media according to an embodiment of the present invention.

Referring to FIG. 16, flowchart 1600 represents the general operational flow of an embodiment of the present invention. More specifically, flowchart 1600 shows an example of a control flow for producing and distributing enhanced media according to the present invention.

The control flow of flowchart 1600 begins at step 1601 and passes immediately to step 1602. At step 1602, the user operates an enhanced media client 120 to receive an enhanced media viewer as described in steps 1501–1595 of FIG. 15. The user would review, for example, the news stories displayed in the standard or customized listing (e.g., media index 1104 of FIG. 11 below). The user can request to review all or a subset of the displayed stories in any order. The user would operate enhanced media client 120 to send the request to enhanced media server 115.

At step 1604, enhanced media server 115 would interact with IM server 130 to verify the availability and obtain the location of the selected news stories.

Enhanced media server 115 would also interact with streaming server 125 to assemble and encode the selected news stories. During this process, streaming server 125 would also include various media enhancements into the media stream with the news stories. The media enhancements could include extended play video, related web sites, supporting graphics and the like. Additionally, enhanced media server 115 would interact with AD server 135 to link national or local advertisements with the media streams. The advertisements could include active banners, pre-roll commercials, email correspondence and similar promotions.

At step 1606, the media stream containing the requested news stories, media enhancements and advertisements are transmitted to the requesting enhance media client 120. In an embodiment, the media stream is continuously feed to the media client 120 to produce a seamless or near seamless display. This is accomplished by using the fragmentation and buffering techniques of the present invention, as described detail below. However in another embodiment, the media production can be downloaded for delayed viewing. In another embodiment, the media production can be saved on a local memory of the enhanced media client 120 for future viewing.

At step 1608, enhanced media server 115 collects various types of data from the enhanced media client 120 in regards to the media production. In an embodiment, the quantity and types of linked advertisements are logged and tracked. In another embodiment, data is collected to track the quantity of click-throughs, page-views, hits and the like for each linked advertisement. The data tracking functionality of the present invention is provided to measure the quantity of consumers that actually receive a specific advertisement. In an embodiment, pricing models are based on consumer demand and behavioral patterns, and the sponsor of the advertisement is invoiced accordingly. The revenue generated from the pricing models are apportioned among network participants, including, but not limited to, (1) the television stations or other media hosting facilities which create or provide the media production, (2) the operator of the portal hosting the web page that permits the user to request the media production, and (3) other participants in the network. Upon collection of the advertisement metrics and the accounting of the advertisement revenue, the control flow ends as indicated at step 1695.

Thus, the present invention provides a method and system for distributing enhanced media and advertisements over a widely distributed network in response to the actual demands and behavioral patterns of online viewers. The present invention permits advertisements to be linked to the enhanced media and presented to the viewers who are most likely to purchase the promoted item. The cost for such advertisements is based on the actual distribution to the viewer, and the resulting revenue is apportioned among the network participants. Moreover, the present invention supports various reporting features that ensure the accuracy and completeness of the accounting functionality.

II. Enhanced Media Production and Storage

The system and method of the present invention supports live and on-demand distribution of media productions over a widely distributed communications network. The media productions primarily include video of news programs, television programming (such as, documentaries, situation comedies, dramas, variety shows, interviews, and the like), sporting events, concerts, infomercials, movies, video rentals, and the like. Media productions also include live or recorded audio (including radio broadcast), graphics, text, and other forms of media and multimedia.

1. Media Production System

The system and method of the present invention is configurable to receive, generate or transmit media productions from a variety of sources. Referring back to FIG. 1, media production system 145 is one media source for system 100. Media production system 145 is representative of a conventional, manual multimedia production environment or an automated multimedia production system.

1.1. Manual Media Production

In an embodiment, the present invention is implemented with a manual media production system. Conventionally, the execution of a live or live-to-tape video show, such as a network news broadcast, talk show, or the like, is largely a manual process involving a team of specialized individuals working together in a media production environment having a studio and a control room. The media production environment is comprised of many diverse types of media production devices, such as video cameras, microphones, video tape recorders/players (VTRs), video switching devices, audio mixers, digital video effects devices, teleprompters, and video graphic overlay devices, and the like. The basics of video production techniques is described in "Television Production Handbook," Zettl, 1997 Wadsworth Publishing Company, which is incorporated herein by reference.

In a conventional production environment, the media production devices are manually operated by a production crew (which does not include the performers and actors, also known as the "talent") of artistic and technical personnel working together under the supervision of a director. A standard production crew is made up of four or more individuals, including camera operators (usually one for each camera, where there are usually three cameras), a video engineer who controls the camera control units (CCUs) for each camera, a teleprompter operator, a character generator operator, a lighting director who controls the studio lights, a technical director who controls the video switcher, an audio technician who controls an audio mixer, tape operator(s) who control(s) a bank of VTRs, and a floor director inside the studio who gives cues to the talent. Typically, the director coordinates the entire production crew by issuing verbal instructions to them according to a script referred to as a director's rundown sheet. Generally, each member of the production crew is equipped with a headset and a microphone to allow constant communication with each other and the director through an intercom system.

Upon completion of the media production, the resulting video tape, film or digital recording is outputted or feed into media encoding system 140 or archived in media production IMS 150, as shown in FIG. 1. Media production IMS 150 permits the media to be saved or retrieved by filename for future editing or broadcasts. In an embodiment, an operator would use a computer workstation (not shown) to edit or format the video or the like prior to the media being transmitted to media encoding system 140 or media production IMS 150. In another embodiment, the program is fed in real time to the media encoding system 140 and stored (e.g., media production IMS 150) in an encoded format for editing.

1.2. Automated Media Production

In another embodiment, media production system 145 is representative of an automated multimedia production environment, and produces live and live-to-tape broadcasts of a media production. In this embodiment, media production system 145 is a fully integrated multimedia production system that is operable to automate the execution of a show in analog and digital video environments. As an automated system, media production system 145 is preferably, but not necessarily, of the type described in commonly assigned U.S. Pat. Ser. No. 09/634,735, filed Aug. 8, 2000, by Snyder et al., and entitled "System and Method for Real Time Video Production and Multicasting," (hereinafter referred to as "the '735 application"). The disclosure of the '735 application is incorporated herein by reference as though set forth in its entirety.

In an embodiment, media production system 145 commands and controls the operation of a variety of media production devices. The term "media production device" is intended to include video switcher, digital video effects device (DVE), audio mixer, teleprompting system, video cameras and robotics (for pan, tilt, zoom, focus, and iris control), record/playback device (RPD), character generator, still store, studio lighting devices, news automation devices, master control/media management automation systems, commercial insertion devices, compression/decompression devices (codec), virtual sets, and the like. The term "RPD" includes VTRs, video recorders/servers (including media production IMS 150), virtual recorder (VR), digital audio tape (DAT) recorder, or any device that stores, records, generates or plays back via magnetic, optical, electronic, or any other storage media.

In an embodiment, media production system 145 receives and routes live feeds (such as, field news reports, news services, sporting events, and the like) from any type of communications source, including satellite, terrestrial (fiber optic, copper, coaxial, and the like), radio, microwave or any other form or method of video transmission, in lieu of, or in addition to, producing a live show within a studio.

In addition to controlling media production devices, media production system 145 is configurable to convert a show rundown into computer readable broadcast instructions to automate the execution of a show without the need of an expensive production crew to control the media production devices. In an embodiment, the broadcast instructions are created from the Transition Macro™ multimedia production control program developed by ParkerVision, Inc. (Jacksonville, Fla.) that can be executed to control an automated multimedia production system. As described in the '735 application, the Transition Macro™ program is a timeline-based application that allows serial and parallel processing of media production commands to automate the control of a multimedia production environment. Each media production command is associated with a timer value and at least one media production device.

Figure 4A:
FIG. 4a illustrates an interactive time sheet graphical user interface (GUI) according to an embodiment of the present invention.
Figure 4B:
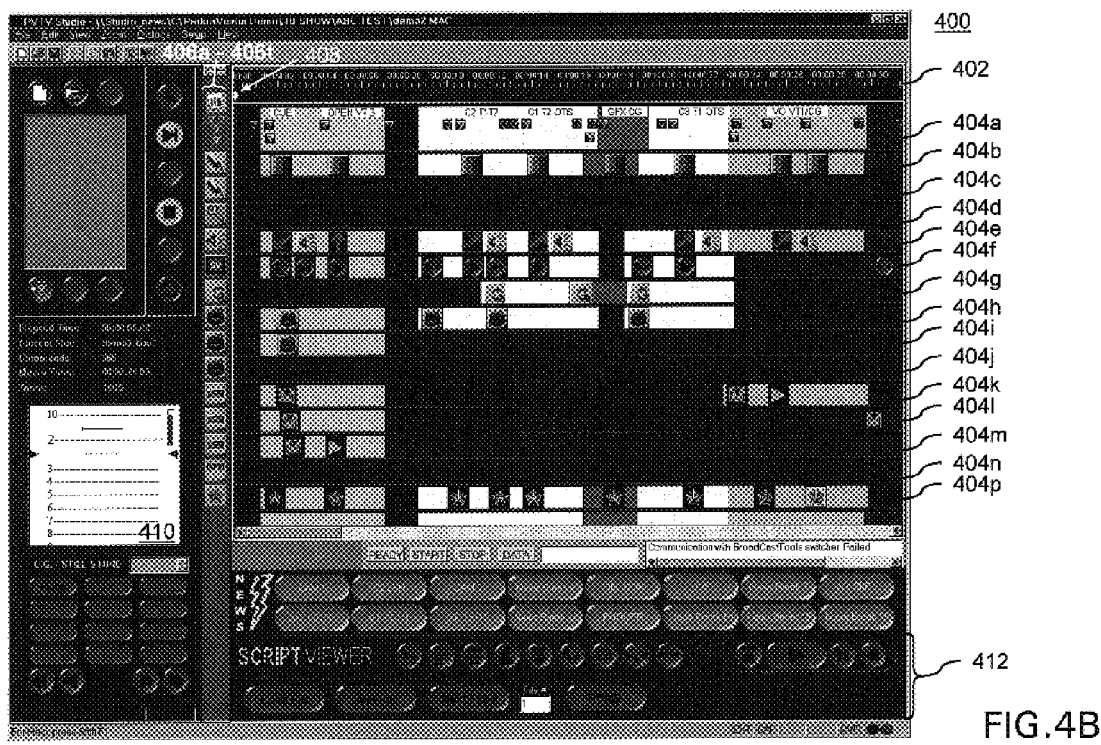
FIG. 4b illustrates an interactive time sheet graphical user interface (GUI) according to another embodiment of the present invention.

FIG. 4 (shown as FIG. 4a and FIG. 4b) illustrates an embodiment of an interactive time sheet created by a timeline-based application on a graphical user interface (GUI) 400. The time sheet includes a horizontal timeline 402 and one or more horizontal control lines 404a–404p. Automation control icons 406a–406t are positioned onto control lines 404a–404p at various locations relative to timeline 402, and configured to be associated with one or more media production commands and at least one media production device. FIG. 4a illustrates an embodiment of the time sheet prior to the placement of automation control icons 406a–406t onto control lines 404a–404p, and FIG. 4b illustrates an embodiment of the time sheet after such placement of automation control icons 406a–406t.

A timer (not shown) is integrated into timeline 402, and operable to activate a specific automation control icon 406a–406t as a timer indicator 408 travels across timeline 402 to reach a location linked to the specific automation control icon 406. As a result, media production system 145 would execute the media production commands to operate the associated media production device.

In regards to automation control icons 406a–406t, label icon 406a permits a director to name one or more segments or portions of a time sheet. In embodiment, the director would drag and drop a label icon 406a onto control line 404a, and double click on the positioned label icon 406a to open up a dialogue box to enter a text description. The text would be displayed on the positioned label icon 406a. Referring to FIG. 4, exemplary label icons 406a have been generated to designate "A01," "CUE," "OPEN," "A02," etc.

Control line 404a is also operable to receive a step mark icon 406b, a general purpose input/output (GPI/O) mark icon 406c, a user mark icon 406d, and an encode mark 406e. Encode mark 406e is described in detail below with reference to FIG. 5. Step mark icon 406b and GPI/O mark icon 406c are associated with time sheet step commands. The time sheet step commands instruct timer indicator 408 to start or stop running until deactivated or reactivated by the director or another media production device. For example, step mark icon 406b and GPI/O mark icon 406c can be placed onto control line 404a to specify a time when timer indicator 408 would automatically stop running. In other words, timer indicator 408 would stop moving across timeline 402 without the director having to manually stop the process, or without another device (e.g., a teleprompting system (not shown)) having to transmit a timer stop command. If a step mark icon 406b is activated to stop timer indicator 408, timer indicator 408 can be restarted either manually by the director or automatically by another external device transmitting a step command. If a GPI/O mark icon 406c is used to stop timer indicator 408, timer indicator 408 can be restarted by a GPI or GPO device transmitting a GPI/O signal.

In an embodiment, step mark icon 406b and GPI/O mark icon 406c are used to place a logically break between two segments on the time sheet. In other words, step mark icon 406b and GPI/O mark icon 406c are placed onto control line 440a to designate segments within a media production. One or more configuration files can also be associated with a step mark icon 406b and GPI/O mark icon 406c to link metadata with the designated segment.

Transition icons 406f–406g are associated with automation control commands for controlling video switching equipment. Thus, transition icons 406f–406g can be positioned onto control lines 404b–404c to control one or more devices to implement a variety of transition effects or special effects into a media production. Such transition effects include, but are not limited to, fades, wipes, DVE, downstream keyer (DSK) effects, and the like. DVE includes, but is not limited to, warps, dual-box effects, page turns, slab effects, and sequences. DSK effects include DVE and DSK linear, chroma and luma keyers.

Keyer control icon 406h is positioned on control line 404d, and used to prepare and execute keyer layers either in linear, luma, chroma or a mix thereof for preview or program output. The keyers can be upstream or downstream of the DVE.

Audio icon 406i can be positioned onto control line 404e and is associated with commands for controlling audio equipment, such as audio mixers, digital audio tape (DAT), cassette equipment, other audio sources (e.g., CDs and DATs), and the like. Teleprompter icon 406j can be positioned onto control line 404f and is associated with commands for controlling a teleprompting system to integrate a script into the timeline. Character generator (CG) icon 406k can be positioned onto control line 404g and is associated with commands for controlling a CG or still store to integrate a CG page into the timeline. Camera icons 406l–406n can be positioned onto control lines 404h–404j and are associated with commands for controlling the movement and settings of one or more cameras. VTR icons 406p–406r can be positioned onto control lines 404k–404m and are associated with commands for controlling VTR settings and movement. GPO icon 406s can be positioned onto control line 404n and is associated with commands for controlling GPI or GPO devices. Encode object icon 406t can be positioned onto control line 404p and is associated with encoding commands which are described in detail below with respect to FIG. 7.

User mark icon 406d is provided to precisely associate or align one or more automation control icons 406a–406c and 404e–404t with a particular time value. For example, if a director desires to place teleprompter icon 406j onto control line 404f such that the timer value associated with teleprompter icon 406j is exactly 10 seconds, the director would first drag and drop user mark icon 406d onto control line 404a at the ten second mark. The director would then drag and drop teleprompter icon 406j onto the positioned user mark icon 406d. Teleprompter icon 406j is then automatically placed on control line 404f such that the timer value associated with teleprompter icon 406j is ten seconds. In short, any icon that is drag and dropped onto the user mark 406d is automatically placed on the appropriate control line and has a timer value of ten seconds. This feature helps to provide multiple icons with the exact same timer value.

After the appropriate automation control icons 406 have been properly position onto the time sheet, the time sheet can be stored in a file for later retrieval and modification. Accordingly, a show template or generic time sheet can be re-used to produce a variety of different shows. A director could recall the show template by filename, make any required modifications (according to a new rundown sheet), and save the time sheet with a new filename.

As described above, one media production device is a teleprompting system (not shown) that includes a processing unit and one or more displays for presenting a teleprompting script (herein referred to as "script") to the talent. In an embodiment, the teleprompting system is the SCRIPT Viewer™, available from ParkerVision, Inc. As described in the '735 application, a teleprompting system can be used to create, edit, and run scripts of any length, at multiple speeds, in a variety of colors and fonts. In an embodiment of the present invention, the teleprompting system is operable to permit a director to use a text editor to insert media production commands into a script (herein referred to as "script commands"). The text editor can be a personal computer or like workstation, or the text editor can be an integrated component of time sheet GUI 400. Referring to FIG. 4, text window 410 permits a script to be viewed, including script commands. Script controls 412 are a set of graphical controls that enable a director to operate the teleprompting system and view changes in speed, font size, script direction and other parameters of the script in text window 410.

The script commands that can inserted by the teleprompting system include a cue command, a delay command, a pause command, a time sheet step command, and an enhanced media command. As discussed below, enhanced media commands permit the synchronization of auxiliary information to be linked for display or referenced with a script and video. This allows the enhanced media client 120 to display streaming video, HTML or other format graphics, or related topic or extended-play URLs and data. The present invention is not limited to the aforementioned script commands. As would be apparent to one skilled in the relevant art(s), commands other than those just listed can be inserted into a script.

1.3. Radio Broadcasts

In an embodiment of the present invention, media production system 145 is operated by a hosting radio station. Enhanced media clients 120 can be located within the broadcast region of the hosting radio station, such that a listener can receive the radio broadcast with the aid of a conventional radio. Alternatively, enhanced media clients 120 can be located in a remote (including international) area. If remotely located, enhanced media clients 120 would receive the broadcasts over communication interface 110 (e.g., the Internet) and played to the listener with conventional audio files. Hence, in an embodiment, a hosting radio station utilizes media production system 145 to provide live or on-demand downloads or streams of audio content (e.g., WAV files) to enhanced media clients 120. The audio content can be related or unrelated to a currently aired radio broadcast.

In an embodiment, the radio station is equipped with manually operated or automated multimedia production equipment. The media production equipment is used to produce live or live-to-tape recordings of a radio program. A listener (operating an enhanced media client 120) would therefore be able to download or receive streams of live or on-demand video of a disc jockey, program host, program guest, and the like, while the listener receives the audio broadcast on a radio or an enhanced media client 120.

In an embodiment, the radio station web site that provides access to an audio or video production is also operable to promote various merchandise related to the audio or video production. For example, the merchandise can include compact discs, DVD or music videos related to the broadcast content. Other merchandise includes clothing, posters and like paraphernalia. The merchandise promotions can be linked to a specific audio or video segment, or a more generic advertising scheme. In addition, enhanced media server 115 could stream archived music videos. Once viewed by the user on enhanced media client 120, a purchase can be made of the music video via an electronic shopping cart, email request or other electronic means to obtain a copy in either a streaming format such as an MP3 or WAV file, compact disc or other media type.

2. Content Archival and Retrieval

The system and method of the present invention can be integrated with content supplied from a variety of sources. To enable future recall of recordings and support on-demand functionality, an indexing scheme is implemented to uniquely identify each content, including segments of the content. The indexing scheme uses content production codes to mark or identify a segment within a media stream. For example, a multimedia production of a newscast is composed of various video segments, such as an individual news clip, weather report, sports updates, and the like. Each segment is given a unique name to enable the system and method of the present invention to identify or load that particular segment. The content production code can be embodied as a time code, frame code, or other universal marking schemes.

In an embodiment, the content is marked with a time code. The time code can be associated with the content when the content is created by the originating source or received by a querying system (i.e., media production system 145). The time code can include data that identifies the source of the media production. Other markings can also be added to supplement the time code as would be apparent to one skilled in the relevant art(s).

In an embodiment, the content is marked with a frame code to identify a media segment. The frame code is selected from a list of alphanumerical characters or other symbols. Similar to a time code, the frame code can also be supplemented with a marking to identify the source of the media production, or other identifiers as would be apparent to one skilled in the relevant art(s).

In an embodiment, the content is marked with a universal marking scheme based on alphanumeric characters, symbol, or a combination thereof. The universal marking scheme permits the querying system to uniquely classify or identify a specific media segment. Additionally, the universal marking scheme utilizes an absolute standard for labeling content for worldwide distribution.

For example, in an embodiment, the content is created by a time-based automated multimedia production system, such as the interactive time sheet shown in GUI 400. In this embodiment, referring back to FIG. 4, a content production code (e.g., time code, frame code, universal marking, and the like) is selected as timer indicator 408 moves across timeline 402 to activate a specific icon 406 to trigger a video transition. When timer indicator 408 advances beyond the specific icon 406, media production system 145 would instruct a media production device to mark the segment following the video transition with the selected content production code. The content production code can subsequently be used to identify, archive or retrieve specific segments from a media production (e.g., televised show). In an embodiment, the content production code is stored with other metadata, such as a segment descriptor (e.g., sports, weather, or news story topic tags).

As discussed, the system components are operable to query and write to various archival and retrieval systems, such as media production IMS 150, extended-media IMS 160, and advertisement IMS 170. In an embodiment, a media production is stored in an archival and retrieval system after the content is created or retrieved, and labeled (if not properly marked with a content production code). The archival and retrieval system can include a secondary memory (such as, secondary memory 310 described in reference to FIG. 3 above). To support larger volumes of content, one or more integrated databases or a data warehouse system is used to store the content to support the respective server as described herein. In an embodiment, the archival and retrieval system includes a relational or object oriented (OO)/component based database management system (not shown), or the like, that controls the storing, retrieving and updating of data and metadata in the database records. The database management system also controls data integration, enforces integrity rules and constraints (including data integrity and referential integrity), and enforces security constraints.

The archival and retrieval system is a scalable system that stores data on multiple disk arrays. Data warehousing can be implemented with the SQL Server 2000 application available from Microsoft Corporation, the Oracle 9i™ database available from Oracle Corporation (Redwood City, Calif.), or the like. The archival and retrieval system supports Open DataBase Connectivity (ODBC) or Java DataBase Connectivity (JDBC) protocols.

The archival and retrieval system can be centrally located or a widely distributed system. In an embodiment, one or more components of the archival and retrieval system are located at the same facilities of the querying system. In another embodiment, one or more components of the archival and retrieval system are located at the facilities of the originator of the content. Accordingly, the querying system component (e.g., media production system 145) would request the content (e.g., video of a news story) by content production code or the like. In another embodiment, one or more components of the archival and retrieval system is located or managed by a third party. Therefore, the content originator would send or license the content to the third party, and the querying system component (e.g., media production system 145) would request the content by using the content production code or the like.

III. Webcast Production

In an embodiment of the present invention, enhanced media server 115 streams live video, and/or record and store to a record/playback device (RPD) a live video show. For example, the show can be a news program reporting stories related to weather, sports, business, technology, human interests or other news topics. In a preferred embodiment, the entire show is video streamed over the Internet (i.e., communication infrastructure 110) for viewing by one or more users logging into the hosting web site. If a user cannot log in at the scheduled airtime to view the live broadcast, on-demand functionality is available to replay the entire show or selected segments from the show. The live or on-demand broadcasts can be streamed from enhanced media server 115 in real time or downloaded to permanent or temporary files on an enhanced media client 120 for subsequent viewing.

Enhanced media server 115 supports client requests for on-demand and customizable broadcasts of a show or selected segments from a show. To enable this functionality, encoded metadata that is descriptive of the segments is created during the media production and saved in the archival and retrieval system (e.g., media production IMS 150, extended-media IMS 160, etc.) in real time. Subsequently, the video frames from the show can be retrieved by the associated metadata, such as the content production code.

Referring back to FIG. 1, an encoding process is implemented by media encoding system 140 or extended-media encoding system 155. Irrespective of whether the content is prepared by manual or automated production techniques, media production system 145 or media production IMS 150 transmits the content to media encoding system 140 to be prepared for transmissions over communication interface 110. Similarly, extended-media encoding system 155 operates to prepare extended-media content from extended-media IMS 160 for online transmissions. In an embodiment, media encoding system 140 and extended-media encoding system 155 use a serial digital interface (SDI) to receive the content. However, the present invention can also be implemented with composite, Y/C, RGB or component analog video or any other parallel interfacing.

1. Operational Description

In an embodiment, media encoding system 140 and extended-media encoding system 155 (collectively referred to as "encoding system") utilize timeline-based technology to multiplex media content (e.g., video segment) and metadata into a single media stream. In an embodiment, the encoding system converts uncompressed video or audio data to compressed digital streams or files. The encoding system is configurable to compress video files (e.g., avi format), audio clips (e.g., wav format), and still images (e.g., bmp or jpg formats) into an MPEG format or the like. The encoding system is also configurable to re-encode an existing MPEG file, or the like, to modulate the file parameters (e.g., bit rate, video dimensions, frame rates, sampling rates, and the like). Finally, the encoding system can be configured to index or catalog the encoded media streams, or segments of the encoded media streams. Indexing or cataloging reduces the encoding processing time and memory requirements for future transmissions of the same streams.

As described above, the encoding system of the present invention is operable with both an automated and manually-operated configuration of media production system 145. With both content sources, the encoding system formats the media content with timeline-based techniques or methodologies.

Referring back to FIG. 4, GUI 400 illustrates an embodiment of a time sheet that can be used to encode a media production from an automated environment. As discussed above, control lines 404a–404n contain automation control icons 406a–406s that are operable to automatically control media production devices and produce a video show. However, control lines 404a and 404p are used to enter encode mark 406e and encode object icon 406t, respectively, that are associated with encoding commands. As timer indicator 408 moves across timeline 402, the associated encode mark 406e and encode object icon 406t would send commands to the encoding system to format the media streams.

In an embodiment, a director can enter encode mark 406e and encode object icon 406t onto control lines 404a and 404p, respectively, when the director uses media production system 145 to place the other automation control icons 406a–406d and 406f–406s that are associated with other media production commands onto control lines 404a–404n. In another embodiment, a director can enter encode mark 406e and encode object icon 406t after the media production has been completed and approved. In this embodiment, the director could use either media production system 145 or media encoding system 140 to enter encode mark 406e and encode object icon 406t.

Figure 5:
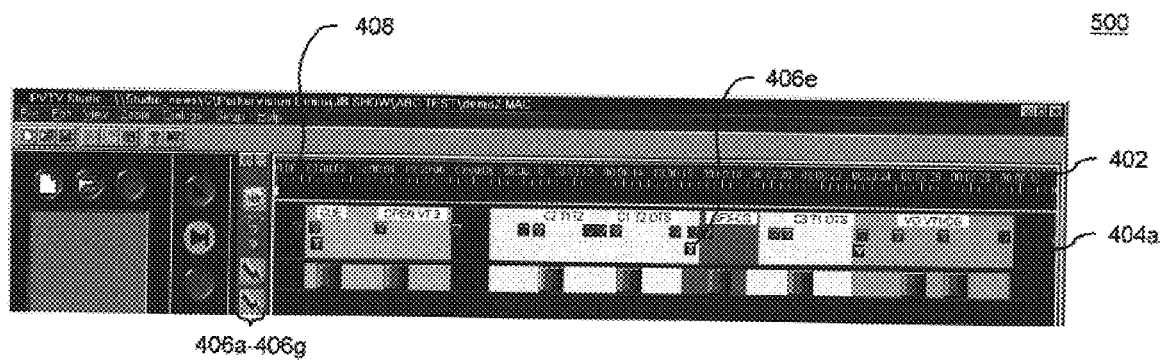
FIG. 5 illustrates an alternative view of the time sheet GUI of FIG. 4.

FIG. 5 illustrates the top region of GUI 400 to provide a view of control line 404a. Control line 404a is used to enter icons 406a–406d that are associated with step commands and icon alignment commands, as discussed above. Another automation control icon that can be placed on control line 404a is encode mark 406e. In an embodiment, encode mark 406e operates like a Web Mark™ developed by ParkerVision, Inc. During the encoding process, encode mark 406e identifies a distinct segment within a media production. As timer indicator 408 advances beyond encode mark 406e, the encoding system is instructed to index the beginning of a new segment. In an embodiment, as the encoding process is executed, media encoding system 140 automatically clips the media production into separate files based on the placement of encode mark 406e. This facilitates the indexing, cataloging and future recall of segments identified by the encode mark 406e.

Figure 6:
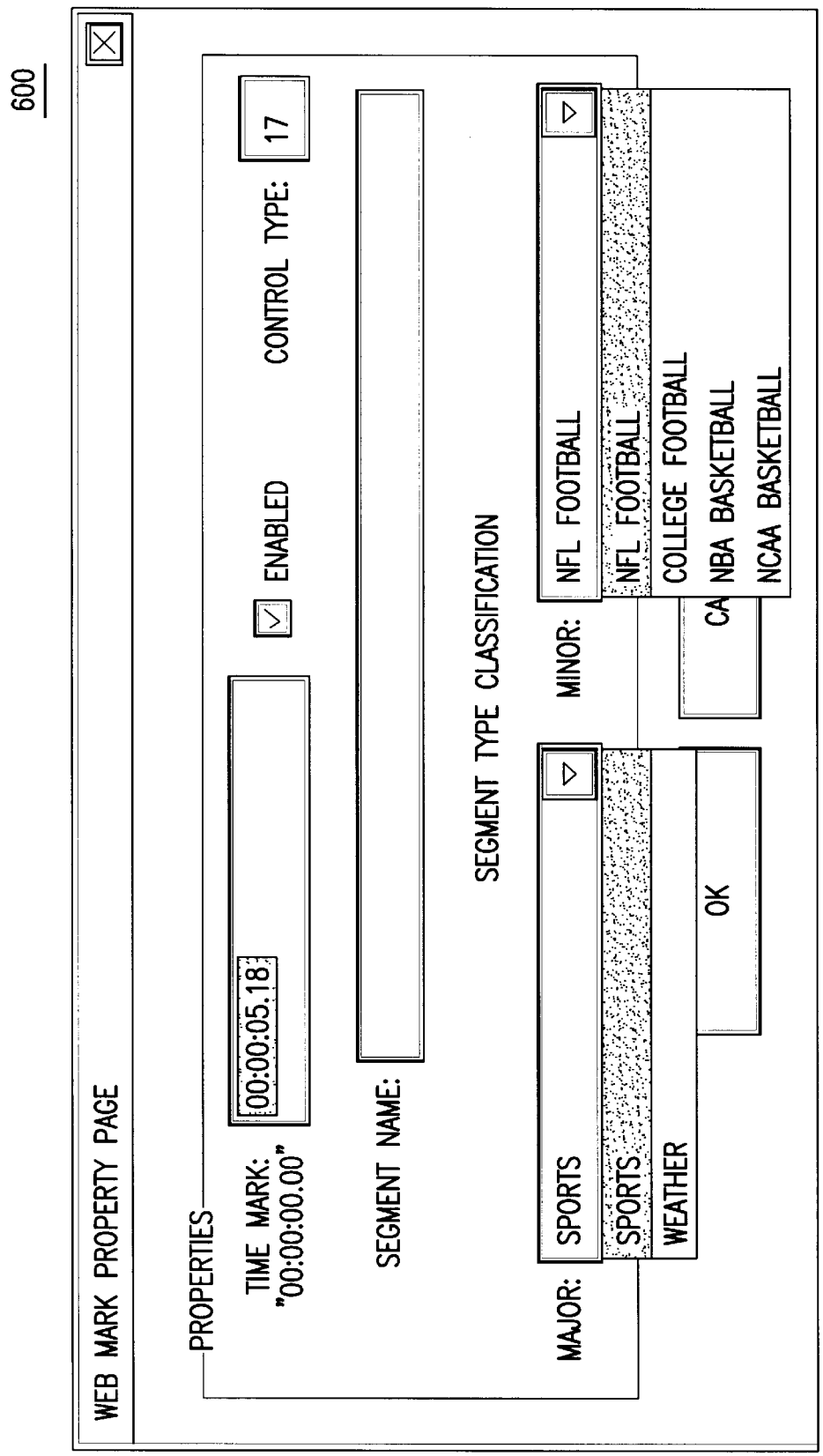
FIG. 6 illustrates of an encode mark configuration GUI according to an embodiment of the present invention.

In an embodiment, the properties of each encode mark 406e are established by activating encode mark 406e to open a configuration GUI. FIG. 6 illustrates an embodiment of an encode mark configuration GUI 600. GUI 600 can be used to set the time for initiating the encoding commands associated with encode mark 406e. The time can be manually entered or is automatically entered at the time of placing encode mark 406e on control line 404a. GUI 600 also permits an operator to designate a name for the segment, and specify the segment type classification. Segment type classification includes a major and minor classification. For example, a major classification or topic can be sports, weather, headline news, traffic, health watch, elections, and the like. Exemplary minor classifications or category can be local sports, college basketball, NFL football, high school baseball, local weather, national weather, local politics, local community issues, local crime, editorials, national news, and the like. Classifications can expand beyond two levels to an unlimited number of levels for additional granularity and resolution for segment type identification and advertisement targeting. In short, the properties associated with each encode mark 406e provide a set of metadata that can linked to a specific segment. These properties can be subsequently searched to identify or retrieve the segment from an archive.

Figure 7:
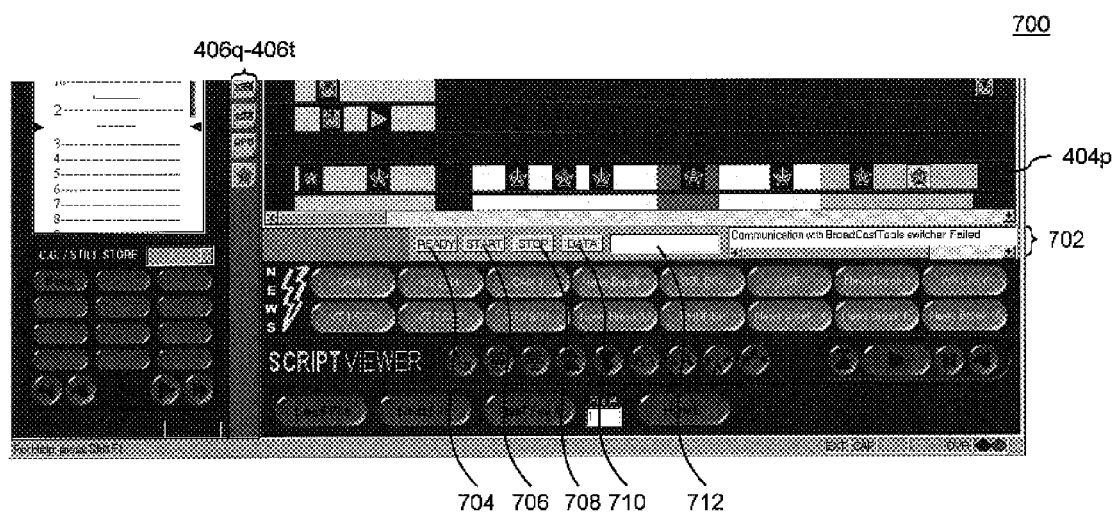
FIG. 7 illustrates an alternative view of the time sheet GUI of FIG. 4.

FIG. 7 illustrates the bottom region of GUI 400 to provide a view of control line 404p. Control line 404p is used to enter icons automation control icon 406t that is associated with encoded transmission commands. The encoded transmission commands instructs the encoding system to start or stop the encoding process until deactivated or reactivated by an operator or another media production device.

Figure 8:
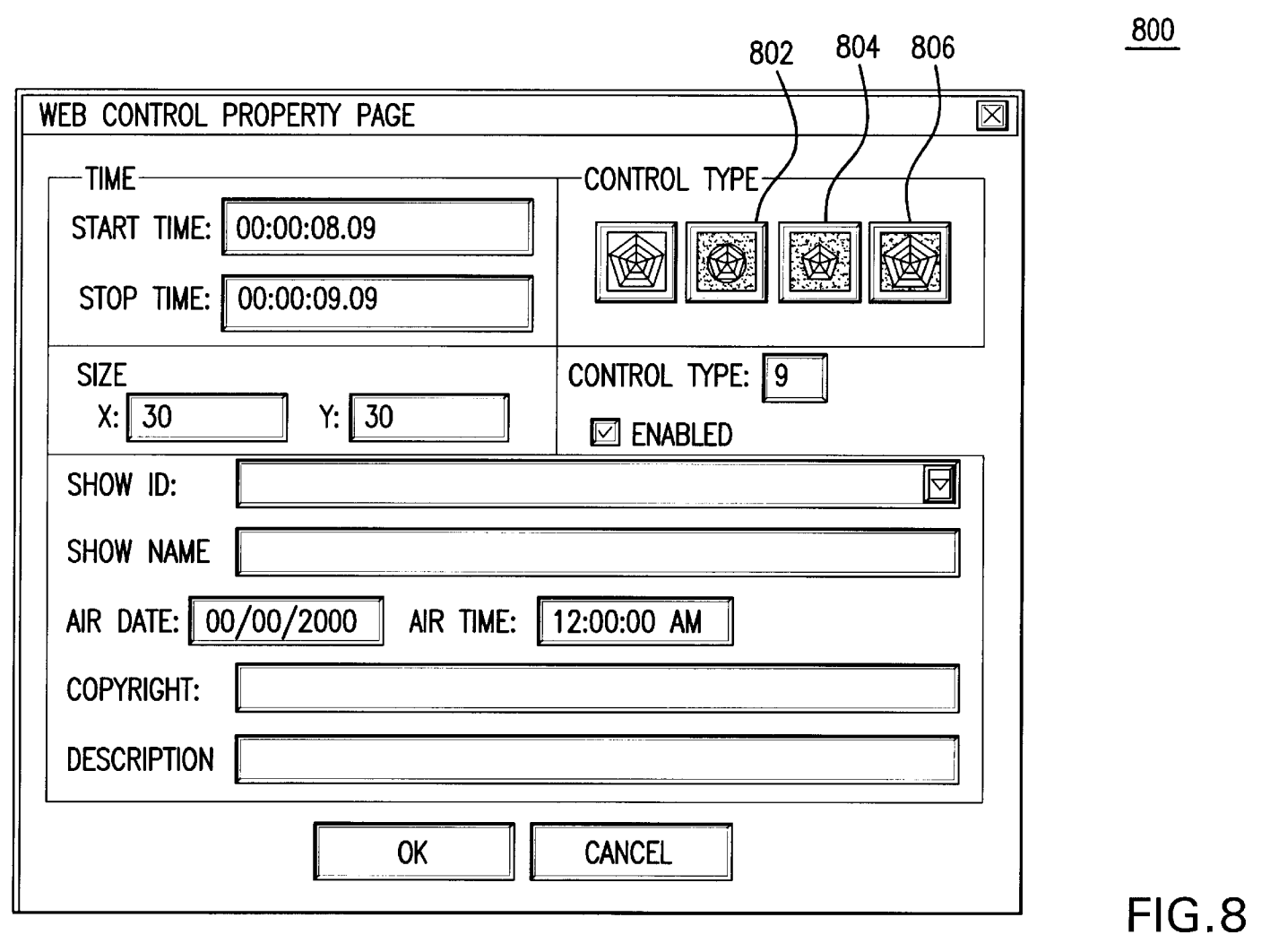

Encode object icons 406t are placed on control line 404p to produce encode objects. In an embodiment, encode object icon 406t operates like Web Objects™ developed by from ParkerVision, Inc. FIG. 8 illustrates an embodiment of a configuration GUI 800 that can be used to set the searchable properties of each encode object icon 406t. In this embodiment, start stream object 802, data object 804 and stream stop object 806 are three types of encode object icons 406t that can be used. Start stream object 802 initializes the encoding system and starts the encoding process. In comparison with encode mark 406e, start stream object 802 instructs the encoding system to start the encoding process to identify a distinct show, whereas encode mark 406e instructs the encoding system to designate a portion of the media stream as a distinct segment. The metadata contained in start stream object 802 is used to provide a catalog of available shows, and the metadata in encode mark 406e is used to provide a catalog of available show segments.

Data object 804 is used to identify auxiliary information to be displayed with the media stream. As described in detail below, auxiliary information includes graphics or text in a HTML page and is referenced in GUI 800 by its URL address.

Stream stop object 806 is used to stop the encoding process and designate the end of a distinct show. Once timer indicator 408 passes the stream stop object 806, the encoding system would start the post-production processes, such as, including indexing segments, cataloging segments, pacing script, and the like.

The encoding start and stop times can be manually entered into GUI 800 or automatically updated upon placement of start stream object 802, data object 804 or stop stream object 806 onto control line 404p. GUI 800 also permits one to designate a show identifier, show name or description for the production. Other properties include the scheduled or projected air date and air time for the production. A copyright field is provided to specify any restrictions placed on the use or re-use of a specific show or show segment. For example, a broadcasting studio may not have a license to transmit a specific content on the Internet, but may have permission to provide the content over a private network or the air waves. The content can be restricted for educational uses, single broadcast, transmissions to designated clients, and the like. The appropriate component of system 100 (e.g., enhanced media server 115, streaming server 125, IM server 130, etc.) would verify the copyright field prior to streaming the content to an enhanced media client 120.

Referring back to FIG. 4 and FIG. 7, as timer indicator 408 moves or passes over each encode object icon 406t (i.e., start stream object 802, data object 804 or stop stream object 806), the associated encoding commands are automatically processed. However, the present invention enables an operator to manually alter the encoding process during execution. In particular, encoding control region 702 provides a set of graphical controls that enable an operator to modify the encoding process. The encoding graphical controls include a ready control 704, start control 706, stop control 708, and data control 710.

Ready control 704 has an "activate" state and "de-activate" state. As such, ready control 704 is operable to send "read" or "not read" commands to timer indicator 408 depending on whether ready control 704 is operating in an activate or de-activate state, respectively. In an embodiment, when ready control 704 is operating in an activate state, timer indicator 408 signals the encoding system to read and process the associated encoding commands as timer indicator 408 passes each encode object icon 406t and encode mark 406e. Similarly, when deactivated, ready control 704 instructs timer indicator 408 to signal the encoding system to not read the encoding commands associated with each encode object icon 406t and encode mark 406e. Therefore, when ready control 704 is de-activated, ready control 704 allows directors to perform test runs to preview a show prior to the broadcast. A preview mode is desirable to allow directors to check the show to make sure that the correct sources and transitions are selected.

Start control 706 is used to initiate the encoding system manually. In an embodiment, start control 706 is operable to manually override a deactivate state established by ready control 704 or stop control 708 (discussed below). Start control 706 can be used to manually activate the encoding process to send media streams to streaming server 125 that contain time-sensitive production elements, such as a breaking news element, or other manually prepared media productions.

Stop control 708 is operable to deactivate the encoding process and stop transmissions to streaming server 125. Stop control 708 would deactivate an encoding process initiated by either ready control 704 or start control 706. Stop control 708 provides directors with the ability to stop the encoding system manually to avoid airing any unauthorized content as an example.

Data control 710 is used to enter auxiliary information and link the information to a specific segment or an entire show. The auxiliary information is entered by typing the URL reference in reference window 712 and activating data control 710. Accordingly, auxiliary information can be entered via the configuration GUI 800 for data object 804 or reference window 712. Data control 710 enables directors to enter URLs at any time during manual operations.

Figure 9:
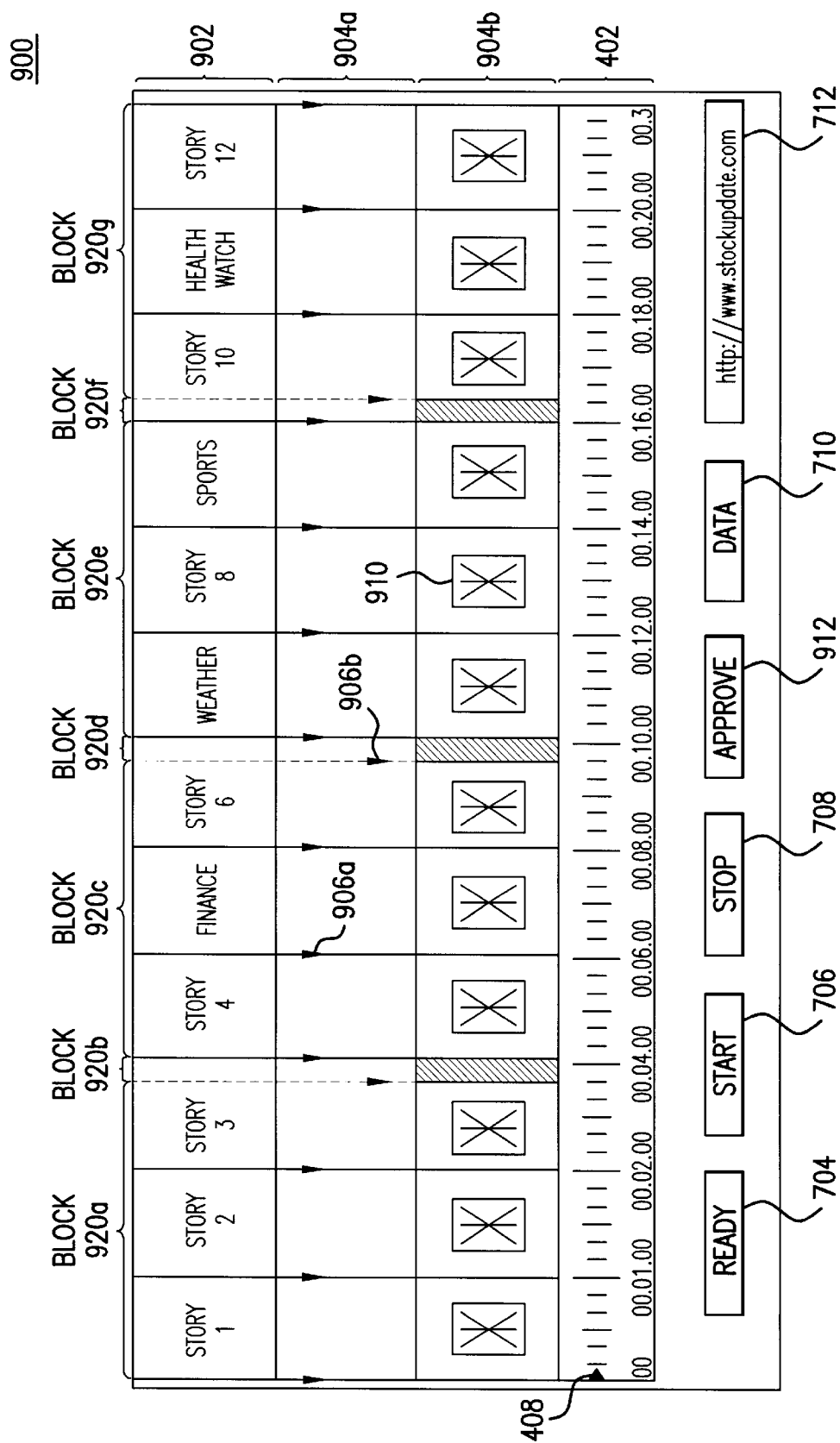
FIG. 9 illustrates an interactive time sheet GUI according to another embodiment of the present invention.

The aforementioned embodiments have been described with reference to an automated media production system 145. However, the encoding system of the present invention can also be implemented as a stand-alone embodiment for processing media produced from manual or conventional media production methodologies or techniques. FIG. 9 illustrates another embodiment of an interactive time sheet GUI 900 for encoding a media production. GUI 900 is primarily configured to support stand-alone operational capabilities, but is also used in automated environments as an approval process to fine tune the beginning and end of segments.

Additionally in an automated environment, GUI 900 can be configured to add, delete or modify segments and links before preparing them for on-demand access. In either case, the media content does not need to be produced in an automated production environment. Even if the media is produced in an automated production environment, the encoding system can be implemented without the media production commands provided from control lines 404*a*–404*n* shown in FIG. 4.

Referring back to FIG. 9, GUI 900 includes a descriptive bar 902, horizontal timeline 402, timer indicator 408, and control lines 904*a*–904*b*. Descriptive bar 902 identifies specific segments of a media production. For example, if the media production is a newscast, each region within descriptive bar 902 can be used to label each story or feature of the broadcast, such as finance, weather, sports, health watch, commercial advertisement, story 1, story 2, and the like.

An editor or director would use control line 904*a* to place a segment mark icon 906 (shown as 906*a* and 906*b*). Segment mark icon 906 identifies the start of an element, segment, or show. By default, segment mark icon 906 also identifies a stopping point for a respective element. Since these icons identify each element individually, they allow the editor or director to edit out any particular story, commercial, or the like. Segment mark icon 906 is similar to encode mark icon 506 by being configurable to initiate encoding commands to designate a segment name, and specify a segment type classification.

Segment mark icon 906 can also be used to cut, edit, or fragment a media production. When activated, segment mark icon 906 instructs the encoding system to label and catalog the designated region of the media stream, so that a specific segment can be retrieved for future productions. Segment break icon 906 is also used to cut a segment prior to its actual completion. This can be used to remove unwanted portions of a segment. It can also be used to remove a segment portion tie to insert another video segment or commercial.

For example, descriptive bar 902 show twelve news story elements (i.e., sir Story 1, Story 2, etc.) and four feature elements (i.e., Finance, Weather, etc.) from a previously broadcast or recorded news program. Segment icons 906*a* designates the start and end points for each element. An editor or director preparing the program to be broadcast or re-broadcast would place segment icons 906*b* at desired locations to insert, for example, a commercial feed or another story. In this example, segment icon 906*b* would be used to cut Story 3, Story 6 and Story 10 at the indicated positions on the timeline. Hence, block 920*a* designates the first section of the news program that precedes the first commercial feed inserted at block 920*b*. Likewise, block 920*c* designates the next section of the news program preceding the second commercial feed at 920*d*, and so forth with respect to blocks 920*e*, 920*f* and 920*g*. As intimated, the above example has been provided for illustrative purposes. As would be apparent to one skilled in the relevant art(s), other methodologies or techniques can be implemented to edit a media production and insert additional elements. For example, in lieu of cutting any portion of a video segment, the editor or director could shift the start or stop time for the respective element to make room for a new element (e.g., commercial) on the timeline. Additionally, the editor or director could adjust the properties defined by encode object 910.

Control line 904*b* is used for the placement of encode object 910. Similar to start stream object 802, data object 804, and stop stream object 806, encode object 910 is configurable to instruct the encoding system to integrate metadata with the associated media segment(s) to label and catalog a show and specify auxiliary information to be transmitted with the media segment(s).

GUI 900 also includes graphical controls that enable an editor or director to control or reconfigure the encoding process. Ready control 704, start control 706, stop control 708, data control 710, and reference window 712 have been described with reference to FIG. 7. Approve control 912 provides the director or editor with the ability to approve an encoded media production prior to being transmitted to streaming server 125.

In an embodiment, GUI 900 is a component of a video editing processor. As pre-recorded video is processed by the editing station, GUI 900 is operable to mark, reformat and edit the video consistent with the encoding commands associated with the appropriate icons 906, 908 and 910. As such, the encoding system of the present invention can be used to provide enhance media content to any media production regardless of its source.

Figure 10:
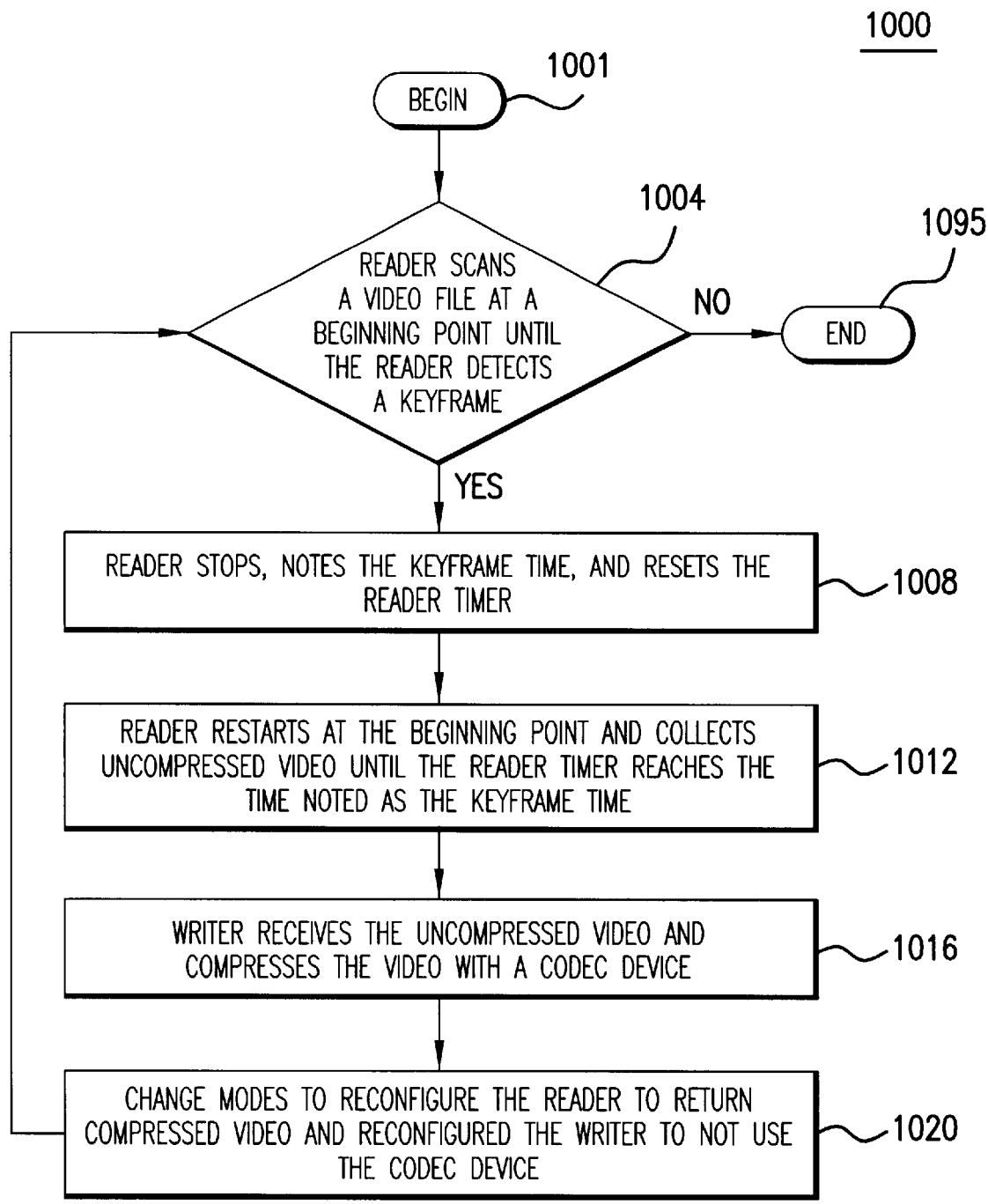
FIG. 10 illustrates an operational flow diagram for the steps involved in fragmenting a media according to an embodiment of the present invention.

As discussed in the above embodiment, to cut or fragment a media production, an operator would manually enter a segment mark icon 906 or segment break icon 908 to instruct the encoding system to fragment the media at the designated location. An embodiment of a fragmentation process used by the encoding system is shown in FIG. 10. Flowchart 1000 represents an example of a control flow for fragmenting media productions according to the present invention.

The control flow of flowchart 1000 begins at step 1001 and passes immediately to step 1004. At step 1004, the encoding system uses a reader (not shown) to scan an input file that contains the media production. The encoding system also includes a timer (not shown) that is set at a start time (e.g., zero). From a beginning point within the file, the reader scans the media production until the reader detects the first keyframe. If no keyframe is detected, the control flow ends at step 1095. The encoding system can be configured to repeat the scanning processes of step 1004 for a predetermined number of times or time period, prior to passing to step 1095.

If a keyframe is detected, the control flow passes to step 1008. At step 1008, the reader suspends the scanning process and notes the keyframe time. The timer is also reset to the start time.

At step 1012, the reader restarts at the beginning point within the media production and collects uncompressed media (e.g., video and/or audio) until the timer reaches the time noted as the keyframe time.

At step 1016, the encoding system uses a writer (not shown) to write the uncompressed media (e.g., video and/or audio) through a codec device (not shown) for compression.

At step 1020, the mode is changed to reconfigure the reader to return compressed media and the writer to not use the codec device. The new beginning point is designated as being the point after the keyframe. Afterwards, the control flow returns to step 1004 to repeat the fragmentation process until all keyframes have been detected.

The fragmentation method embodied by FIG. 10 produces a newly cut file with a keyframe at the start of the clip instead of using delta frames. Additionally, the present invention provides a method for minimizing the requirements for recompression, which in turn improves the quality of the production. Since the entire clip does not have to be recompressed, the fragmentation method of the present invention imparts a significant improvement over conventional video editing methodologies, because the present invention permits faster, real-time productions and allows the encoding system to insert better start and stop points between segments that enable near seamless smooth transitions.

In an embodiment, the encoding process of the present invention is implemented at multiple simultaneous rates. For example, a media production can be encoded simultaneously at 56 kbps, 100 kbps and 300 kbps. Therefore, the fragmentation process described in FIG. 10 can be performed in parallel with other encoding processes.

2. System Features

Enhanced media server 115 can be configured to support a variety of different features to improve the quality of a user's online experience. These features can be implemented regardless of whether enhanced media server 115 is operating as a single portal as shown in FIG. 1 or as a component of an integrated network as shown in FIG. 2.

2.1. Customizable Downstreams

The system and method of the present invention uses various methodologies or techniques to permit an online user to customize a unicast to create a customized program. The present invention supports both passive as well as active customization methods. Active customization is supported by the use of templates, such as subject matter specifications, customer profiles, and the like. Passive customization is provided by cookies, inference engines and the like.

In an embodiment, a user would complete a subject matter specification (not shown) to establish a customized program. The subject matter specification is a form (e.g., HTML format or the like) that contains various fields that provide instructions to enhanced media server 115 for building a media production. One field can be a preferred topic for the subject matter (such as, sports, weather, headline news, traffic, health watch, elections, and the like). Another field can be a preferred category for the subject matter (such as, local sports, college basketball, NFL football, high school baseball, local weather, national weather, local politics, local community issues, local crime, editorials, national news, and the like). Another field can be a geographical source for the preferred subject matter. Additionally, a field can be a preferred creation time or date for the preferred subject matter. For example, the user can specify a preference for college basketball news stories produced within the past two days about teams residing in the southeastern United States. The subject matter specification can also include fields for other user defined parameters, such as the length or duration of the requested media production, a start time for transmitting the media production, an end time for stopping the transmission, and the like.

Using a form to produce a subject matter specification has been provided for illustrative purposes. As would be apparent to one skilled in the relevant art(s), other formats can be used to acquire the requisite data for a subject matter specification. For example, a pull-down menu or an interactive sequencing of dialog boxes (e.g., wizard) can be used to guide the user through the process.

In another embodiment of the present invention, the user would create a user profile to establish a customized program. Similar to a subject matter specification, a user profile collects various data to instruct enhanced media server 115 to build a media production. As discussed above, the data includes preferred topics, categories, content source, duration, start time, and the like. Moreover, the data for the user profile also can be collected from an HTML form, pull-down menu, wizard and the like.

However, a user profile offers one important distinction over a subject matter specification. Subject matter specifications produce a customized program for a current session. A user profile, on the other hand, specifies the parameters for creating customized programs for current and future sessions. In other words, a user can access enhanced media server 115 to establish a user profile to specify the contents, duration and layout for current and subsequent live or on-demand downstreams. Since the saved elements, clips, and segments from a show can be rearranged for subsequent transmissions, a user can select, for example, the type of news stories (i.e., lead story, special reports, college football, local weather, traffic, stock market, and the like), and the priority or sequencing of the news stories.

In an embodiment, the user can specify for the customized program to be produced and stored for future viewing. The new stories, for example, can be downloaded and saved on a memory device on enhanced media client 120, or the user can access the news stories at a later time from enhanced media server 115. If accessing the news stories from enhanced media server 115, the user can opt to receive the most updated version of the new stories.

In an embodiment, the user can configure the profile to request the web site to automatically send email alerts that provide an URL to a live breaking news event. The email alert can be sent to the user email account, or an icon can be created on the client display (for enhanced media client 120) that signals the user. The user can be signaled by the icon flashing or changing colors, or by automatically opening a dialog box or launching the viewer (e.g., media viewer 1102) to display the breaking news event. Other alerts, such as audio alerts, can also be used, as would be apparent to one skilled in the relevant art(s).

The present invention also includes methodologies and techniques to passively establish a customized program for any given user. Passive customization is primarily preformed by considering the past preferences and behavior of a user. In an embodiment, a user profile is automatically created from a cookie or similar identifier that is deposited on the enhanced media client 120 operated by the user. The cookie not only identifies the user, but also can be used to locate a profile that has been previously created by, or for, the user. In another embodiment, a user profile can be created by evaluating the behavioral patterns, demographics, psychographic data, and the like, related to the user. Data mining techniques can be used to gather the information from third party search engines, inference engines, profiling engines, knowledge management systems, databases, and the like (such as the Acxiom® system developed by Acxiom Corporation, or the PRIZM™ system developed by Claritas™ Inc.). Once the user data has been collected or analyzed, a user profile is created to specify, for example, a preferred content, duration and layout for current and subsequent downstreams. In an embodiment, the user has an option to change the automatically prepared profile prior to execution.

The above active or passive methods for creating a user profile or subject matter specification have been provided for illustrative purposes. Other methods could be implemented by one of ordinary skills in the relevant art(s) to create a customized program, and are considered to be within the scope of the present invention. Accordingly, the present invention includes any current or future develop method that allows a user to access a web site (i.e., enhanced media server 115) and receive only those, for example, news stories of interest.

2.2. Continuous Play Mode

In an embodiment, enhanced media server 115 also supports a continuous play mode. This embodiment allows enhanced media server 115 to continuously play back-to-back shows (e.g., newscasts) whether live or prerecorded. At the end of a session, if another show is not scheduled, the previous broadcast is replayed with updated video segments of the previous broadcast, if appropriate. The online user can personalize a broadcast at any time to override the continuous play mode.

2.3. Seamless Transmissions

As described, on-demand transmissions to enhanced media clients 120 are streamed in real time or downloaded to enhanced media clients 120 for delayed viewing. In an embodiment, the broadcasts are continuously streamed to enhanced media clients 120. In this embodiment, the encoding system (i.e., media encoding system 140 and extended-media encoding system 155) assembles the show segments (also referred to as elements) for the entire show (or the selected show segments in the order indicated by the online user) to produce the content as a single video clip. Afterwards, the content is continuously streamed to the requesting enhanced media clients 120 in a manner that avoids multiple downloading. For instance, conventional streaming approaches require clients to load, buffer and stream segments of a media production. For example, a news-broadcasting server would stream each news story separately or the server would divide the news story into sections to send each section separately. The client would receive and buffer each segmented media stream prior to displaying the video segment on the client browser. The client would then receive and buffer the next segment prior to displaying that segment. The process is repeated until the entire production has been displayed. This conventional approach causes delays and creates a disjointed presentation of the media production. Note, however, that although it is not preferred, this conventional approach can be used to implement the present invention.

The continuously streaming feature of the present invention overcomes these problems by assembling and sending multiple segments from the media production to enhanced media clients 120 at once. Enhanced media clients 120 are able to load all the show segments synchronously with each other. Therefore, the user experiences a continuous stream of media without multiple interruptions. Accordingly, continuous streaming maximizes a user's entertainment and focuses on the topic(s) of discussion. Additionally, the feature increases user retention and exposure to the content of the media streams.

2.4. Automatic Record and Playback

In an embodiment, enhanced media server 115 also includes a time shifting apparatus that automatically records and plays back shows at programmable or user-designated time slots. In an embodiment, the playback includes a built-in news cut-in to provide updated information or breaking news, if such information is available at the time of the re-broadcast. The built-in news cut-in can be implemented by inserting a live segment at the beginning of a step-marked frame (time stamped during the recording) of any segment. Enhanced media server 115 can route the advertisements or other data originally linked to the segments, or enhanced media server 115 can route newly associated data links.

2.5. Online User Archives

After a user's customizable downstream has been encoded for transmission, the archival and retrieval system (e.g., media production IMS 150) can save the transmission for future streams to the user. The archival and retrieval system can either save over previously made files or create a historical archive of all encoded segments. For instance, a user may only be interested in the most recent weather forecast. Therefore, in this instance, the archival and retrieval system would save over the weather segment files to make available only the latest data. On the other hand, a specific news segment on a human interest feature can be archived for subsequent broadcasts.

3. Media Enhancement & Webcast Synchronization

As discussed above, a media production can be formatted to include various types of media enhancements, including advertisements. Accordingly, the media streams transmitted to enhanced media clients 120 would include instructions to present auxiliary information and advertisements along with the media production. The auxiliary information includes, but is not limited to, graphics, extended play segments, polling data, URLs, articles, documents, court rulings, other data, and the like. As a result, the present invention provides the user with a multimedia and interactive experience that extends beyond the capabilities of traditional and personal television.

3.1. Advertisements

The method and system of the present invention can be used to allow a broadcaster or other media hosting facility to automatically link advertisements to a specific show or show element by time, duration or topic. Referring back to FIG. 1, a video director or editor can use media production system 145 or media encoding system 140 to add advertisements to a media production. Advertisements include video or audio commercials; dynamic or static banners; sponsorship advertisements; pre-roll advertisements; active or passive advertisements; email correspondence, and the like forms of media and multimedia promotions.

Video or audio commercials can be integrated into a media stream such that the commercial feed can be presented to the user while the user views the media production. For example, the commercial feed can be presented after one or more news stories, at the beginning of the media production, at the end, between scenes within a video production, or at any other place designated by the video director.

The advertisements also include banners. A banner includes any combination of text, graphics and other forms of media and multimedia that promotes a good or service. The banner can be strictly descriptive, or include hypertext, a hot spot, or a hyperlink to open additional banners, place an order, or send a request for additional information to enhanced media server 115 or another server. The banner can be a static banner that only displays the promotional advertisement. However, the banner can also be an active banner that blinks, spins, fades, and the like. The banner can also be a scrolling banner that includes a scroll bar that allows the user to move through contents of the banner. Resizable banners can also be used to allow the user to expand or enlarge the banner to receive more data. The aforementioned is a representative list of banners that can be used with the present invention, it should be understood that any other type of banner capable of promoting a product, including, but not limited to, banners developed with Macromedia® Flash™ or Macromedia® Shockwave®, or the like, as would be apparent to one skilled in the relevant art(s), could be easily included and would not change the scope of the invention.

The advertisements can also be active or passive. An active advertisement requires interaction from the user, such as clicking-though, scrolling and the like. Passive advertisements are displayed and require no interaction from the user. Additionally, the advertisements can take the form of pre-roll advertisements. Such advertisements are commercials, banners and the like that are transmitted to the enhanced media client 120 prior to the startup of the media production.

As such, the present invention supports all types of advertisements that can be transmitted over a client-server network to enhanced media client 120. As a video show is being transmitted over communication infrastructure 110, the advertisements are streamed at specified intervals and durations with the video show. In an embodiment, the advertisements are presented on the side panels of the same frame or window in which the video show is displayed. In another embodiment, the advertisements are streamed in separate frames. In another embodiment, the advertisements are streamed prior to the display of the related segment video. The advertisements can also include a hyperlink to a web site for the sponsor of the advertisement.

In an embodiment, media encoding system 140 queries advertising administration system 165 or AD server 135 to multiplex the advertisements with a media production. In another embodiment, streaming server 125 or enhanced media server 115 queries AD server 135 for an advertisement to be included with a media production. Thus, advertisements can be integrated into a media stream at any stage during media production.

Although either AD server 135 or advertising administration system 165 can manage the queries for advertisements from the other supporting system components, advertising administration system 165 is operable to create or edit advertisement media. Advertising administration system 165 can also be configured to format or encode the advertisements for transmissions.

AD IMS 170 interacts with advertising administration system 165, and stores advertisements for future lookup and retrieval. AD IMS 170 is an archival and retrieval system similar to media production IMS 150 and extended-media IMS 160.

Figure 14:
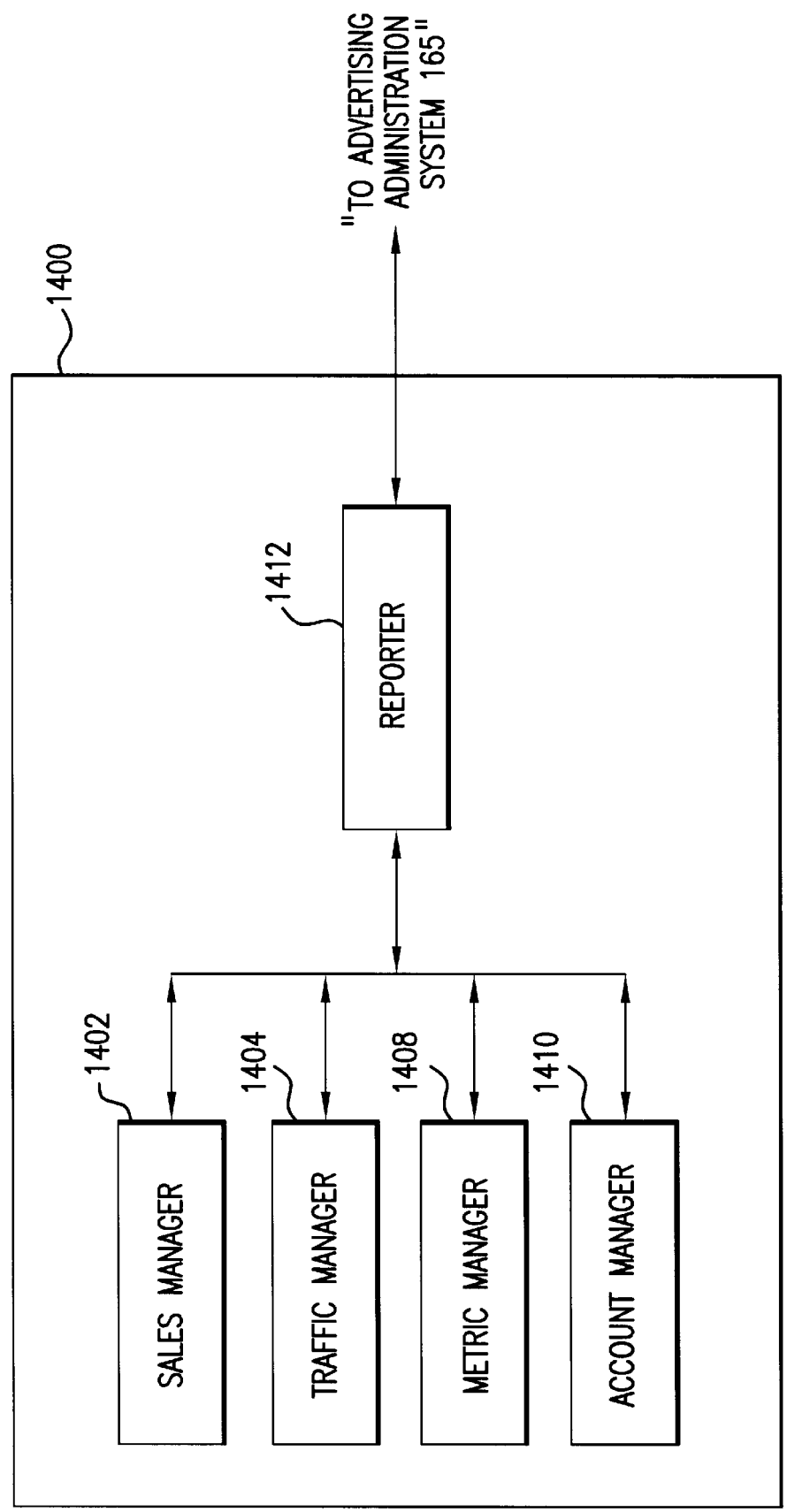
FIG. 14 illustrates an advertisement reporting system according to an embodiment of the present invention.

FIG. 14 illustrates an embodiment of an advertisement reporting system 1400 that can be an internal component of AD IMS 170 or externally coupled to AD IMS 170. In an embodiment, AD IMS 170 uses advertisement reporting system 1400 to manage and report advertisement data related to sales, traffic, metrics, accounting, or the like. Accordingly, advertisement reporting system 1400 includes a sales manager 1402, traffic manager 1404, metrics manager 1408, account manager 1410, and reporter 1412.

Sales manager 1402 processes data used to price or sell advertisements. Typically, an operator would use advertising administration system 165 to gain access to the records of sales manager 1402 to update the pricing or sales data. In an embodiment, a security protocol (e.g., user authorization, user roles, etc.) is provided to protect system and data integrity while an operator is entering and setting advertisement prices.

Sales manager 1402 supports various pricing models. In an embodiment, the prices for the advertisements are based on the content of a media production. The content can be evaluated or determined by a particular show, topic, category, media, time period, or the like. Advertisements linked by content are called targeted advertisements. Such targeted advertisements typically command a higher premium than a non-targeted advertisement used to fill an open slot (i.e., a slot not sold to targeted advertisements). In an embodiment, a targeted advertisement would remain active during the presentation of the linked media production.

In another embodiment, the prices are based on the duration of an advertisement. For example, a thirty-second time slot can be used to determine the base price for a video advertisement. If an advertiser purchases a ten-second commercial, the price can be, for example, fifty percent of the price for a thirty-second commercial length. If, on the other hand, a fifteen-second commercial is purchased, the price can be sixty-five percent of the thirty-second price. In another embodiment, the prices are based on the size (e.g., file size, packet size, etc.) or memory requirements for processing an advertisement.

In another embodiment, sales manager 1402 is operable to calculate cost-per-point (CPP), cost-per-thousand (CPM), or the like based on whether a sponsored segment is delivered in a specific program, time period or advertising slot (i.e., local or national advertising slot), or receives a specific Nielsen rating. In another embodiment, rates are based on a target audience as determined by processing demographic, psychographic or behavioral patterns of online users.

The above pricing models represent over-the-air broadcast models that enable a sales representative to create price differentials based on content or time period. The pricing models of sales manager 1402 are programmable to integrate the advertisement pricing schemes of over-the-air broadcast models with client-server models. Client-server models permit one to set prices based on page views, click-throughs or downloads. As a result, sales manager 1402 can produce an optimal pricing model predicated on user demand and content criteria.

For example, if sales manager 1402 is programmed to implement a pricing model based only on client-server metrics (e.g., page views, click-throughs or downloads), advertisers would most likely choose to sponsor the content logging the greatest number of users because no price differentials are provided by content or time periods. On the other hand, if the pricing model is based only on over-the-air broadcast models (e.g., price differentials per content or time period), the advertiser has no assurance that an online user would actually receive or view the advertisement. However, the flexibility provided by the optimization capabilities of sales manager 1402 empower advertisers to choose from various pricing models that are based on media content, duration, time period, psychographic data, page views, click-throughs, downloads, hits, like metrics, or a combination thereof. Sales manager 1402, in an embodiment, measures or approximates the confidence level for either reaching a predetermined number of users, or ensuring that users are receiving or viewing the advertisements. Sales manager 1402 would also produce, or receive from an operator, prices based on content criteria, such as media content, duration, time period, psychographic data, or the like. Sales manager 1402 would, in turn, use the confidence level and criteria-based prices to establish the actual price for the selected pricing model.

In an embodiment, sales manager 1402 can be configured to search and compile rate cards per newscast, ratings updates, price changes, available advertising slots, and like parameters. Sales manager 1402 also identifies open advertising slots and allows an operator (e.g., a sales representative using advertising administration system 165) to enter advertising orders with customer information. Customer information includes agency name, contact person, account number, mailing information, contact information, newscast selection (including by time), topic selection (e.g., new story, weather, sports, and the like), media selection (video spot—fifteen seconds), duration selection (i.e., no expiration, one day, one week, etc.), hit limits (i.e., no limit, or 1000, 2000, 5000, or 10,000 hits or downloads, etc.) and the like. In an embodiment, sales manager 1402 would assign unsold advertising slots to a default advertisement, such as a logo or feed from the local broadcasting station.

Traffic manager 1404 is responsible for implementing rules and policies to make sure that a linked or assigned advertisement is available and ready to be served. Traffic manager 1404 is programmable to check the availability of the advertisement preceding or during live or on-demand transmissions over communication infrastructure 110. In an embodiment, traffic manager 1404 monitors the expiration date, hit limit, or both for an advertisement. As discussed, a sponsor can stipulate whether the duration for an advertisement is limited or unlimited. The sponsor can also specify a maximum hit target. Once an advertisement has reached its hit limit or expiration date, traffic manager 1404 would block the advertisement from further service. If a hit limit and expiration date both are specified, traffic manager 1404 can cease the advertisement service upon the occurrence of the first event or both events as requested by the sponsor.

Metrics manager 1408 manages data acquisition and reporting capabilities of advertisement reporting system 1400. Metrics manager 1408 is configurable to log, read, archive or format data for customized reports. The reports can be customized by specific advertisement, advertisement agency, and advertised customer (i.e., sponsor). The reports can also be customized by exposure comparisons against selected advertisements, topics, categories and show schedules. In an embodiment, the collected data is the advertisement medium that is being served. Examples of advertisement medium include video streaming advertisement, dynamic advertisement, banner advertisement, sponsorship advertisement, and the like. A sponsorship advertisement typically takes form of a banner that is used to sponsor an HTML page or streaming content. A sponsorship advertisement can be a button-like field positioned at the bottom of a data window, such as advertisement banner 1114b described below in reference to FIG. 11.

Another type of collected data includes timing, duration, or both of the advertisement that is being served. Duration includes time length (in the case of video, fifteen or thirty-second advertisement spot), number of downloads and page views with respect to other types of advertisements, and the like. Various criteria can be used to monitor the timing. The criteria include topic, show, hour, day, week, month, year, and the like.

Page views and click-throughs represent another type of collected data. Page views refer to the actual number of web pages received by an online user. Click-throughs refer to the online user actually clicking on, for example, a banner advertisement to get more information on the advertised product or acknowledge that the user has considered the advertisement. The data collected in response to page views and click-throughs include statistical data with respect to consumer demographics, linked topic and show metadata, download time of day, medium of advertisement, type of advertisement, and the like.

Metrics manager 1408 also queries, processes, or collects consumer demographic, psychographic or behavioral data. In an embodiment, the data is collected via an online user profile (e.g., age, gender, address and the like). In an embodiment, metrics manager 1408 uses data mining techniques to gather information from third party search engines, inference engines, profiling engines, knowledge management systems, databases, and the like (such as the Acxiom® system developed by Acxiom Corporation, or the PRIZM™ system developed by Claritas™ Inc.).

Account manager 1410 manages invoicing, collections and account monitoring and record-keeping functions. In an embodiment, account manager 1410 can be configured to log, read, archive, or format data for customized reports by specific advertisement, advertisement firm, advertised customer, and exposure comparisons against selected advertisements, topics, show schedules, and the like.

As described, sales manager 1402, traffic manager 1404, metrics manager 1408 and account manager 1410 are configurable to produce various types of reports. Reporter 1412 functions to query, receive, format and send the reports to advertising administration system 165. In an embodiment, reporter 1412 queries metrics manager 1408 to prepare a metric report. A metric report can be produced by period, show, topic, account, or the like. A metric report is prepared to assist sales and programming personnel by providing important data such as, downloads per account, content, advertisement medium (i.e., video, banner, sponsorship, etc.), sales parameters, targeting data, advertisement type (i.e., local, national, promotions, announcements, classified, and the like), consumer demographics, and the like.

In an embodiment, reporter 1412 queries account manager 1410 to prepare an account report. An account report provides account management personnel with the status of invoicing activities, collections, account monitoring and record-keeping. The account report can be filtered by specific advertisement or like criteria.

In an embodiment, reporter 1412 queries sales manager 1402 to prepare a sales report identifying open slots available for sale. The sales report can be filtered by time period or like criteria. The sales report can also include sales fulfillment and pricing statistics by account, show, topic, content medium, targeting, advertisement duration (e.g., days, months and year), and the like. In an embodiment, reporter 1412 queries sales manager 1402 to prepare a rate card report that specifies the available pricing schemes for selling advertisement space.

3.2. Auxiliary Information

In addition to advertisements, the present invention includes various features that enhance the content of the media streams. A video director or editor can operate media production system 145 or media encoding system 140 to link informative supporting media that enhances the related segment. In an embodiment, a separate frame is provided on a display for an enhanced media client 120 to present information, statistics, text, video, or like media or multimedia that are related to the media streams. For example, if a sports segment is being broadcast to show an interview of an athlete, in a separate frame, the current statistics for the interviewee can be presented for the user's perusal. Alternatively, the separate frame can include a menu of related data or web sites that online user can select. URL references can also be provided for the user to access, for example, more in-depth data.

In another embodiment, the informative supporting media or media enhancements includes captions or text corresponding to the segments as they are being viewed on enhanced media client 120. Therefore, in an embodiment, a transcript of the segment is synchronized and displayed in a separate frame from the video presentation. In another embodiment, the captions are integrated into the media streams of the show segment and displayed in the same frame as the video. The captions or text can be created by a character generator associated with media production system 145. The captioning feature can be activated or de-activated as necessary.

3.3. Extended Audio-Video

In an embodiment, the media enhancement includes an extended audio or video segment ("extended media"). Extended media can be created and linked to a media productions in a variety of ways. For example, during an editing process, a video director or editor may decide to cut or fragment a show element. The element may be cut to save time or because of a breaking event that causes a change in the rundown. In such an event, the removed elements or a version of the element prior to editing is produced, encoded at extended-media encoding system 155 and stored in extended media IMS 160. A link to the extended media allows an online user to select and view the extended media on demand.

Extended media also includes additional stories in text, audio or video format that are related to a particular media segment. For example, a show element can be a news story related to the PGA Players Championship tournament. Extended media for the news story can include text of par scores, video interview of a player, live audio of the tournament in progress, text article related to golfing equipment, schedule of upcoming tours, and the like.

3.4. Opinion Research

In an embodiment, the method and system of the present invention permits online polling or opinion gathering technologies to be integrated with a media production. The poll can be directed to the content of a specific show segment, a web page design for the hosting portal, preference for receiving advertisements, video presentation, and the like. For instance, in an embodiment, specific polls, surveys, and the like are created for specific show segments, and are cross-referenced and stored by the content production codes identifying the show segments. When a show is assembled for broadcasts (live or on-demand), the appropriate poll is streamed at the designated interval with the related show segment. The poll can be presented on enhanced media clients 120 in the same or a separate frame as discussed with regards to advertisements. During the broadcast, enhanced media server 115 receives the opinion data from the online users. In an embodiment, the opinion data is evaluated, and the results are returned to enhanced media clients 120 in real time. In an embodiment, enhanced media server 115 provide the opinion results for an entire panel of respondents as well as the results for individual respondents. Reports can be generated and based on show, topic, advertiser, or the like for evaluation.

3.5. Hyperlinks to Related Sites

In an embodiment, the method and system of the present invention uses hyperlinks to provide media enhancements. Based on the content of a specific show segment, a URL, email, or geographical address of individuals or organizations related to a show segment is generated, cross-referenced and stored in the archival and retrieval system. The URL address also includes the web site for electronic bulletin boards. When a show is broadcast, this data is presented on the display for enhanced media clients 120 with the related show segment. Accordingly, an online user can activate a hyperlink to visit or send a message to the designated site or individual that is related to the show segment that is currently being viewed.

3.6. Methods of Entering Media Enhancements

The present invention is configured to utilize a variety of techniques or methodologies to link media enhancements, including advertisements, to a media production. In an embodiment for linking media enhancements, a director or editor enters an URL, file identifier, or like designator in a "Web Link" column of a news automation system (described below in FIG. 17 as Web Link Column 1702).

A news automation system is a network of news production computers (not shown) within a newsroom environment. The news production computers are used to aggregate, edit, save or share news stories from a variety of sources among assignment editors, reporters, editors, producers and directors. The news sources include wire services or news services (such as, the Associated Press (AP), Konas and CNN services), police and fire information systems, and field reporters. A news automation system streamlines the show-building process and allows the producer or director to develop a rundown sheet and always know the status of stories during the rundown assembly process. As an example, companies such as iNEWS™ (i.e., the iNEWS™ news service available on the iNews.com web site), Newsmaker, Comprompter, and AP have developed news automation systems to manage the workflow processes associated with a newsroom operation.

Figure 17:
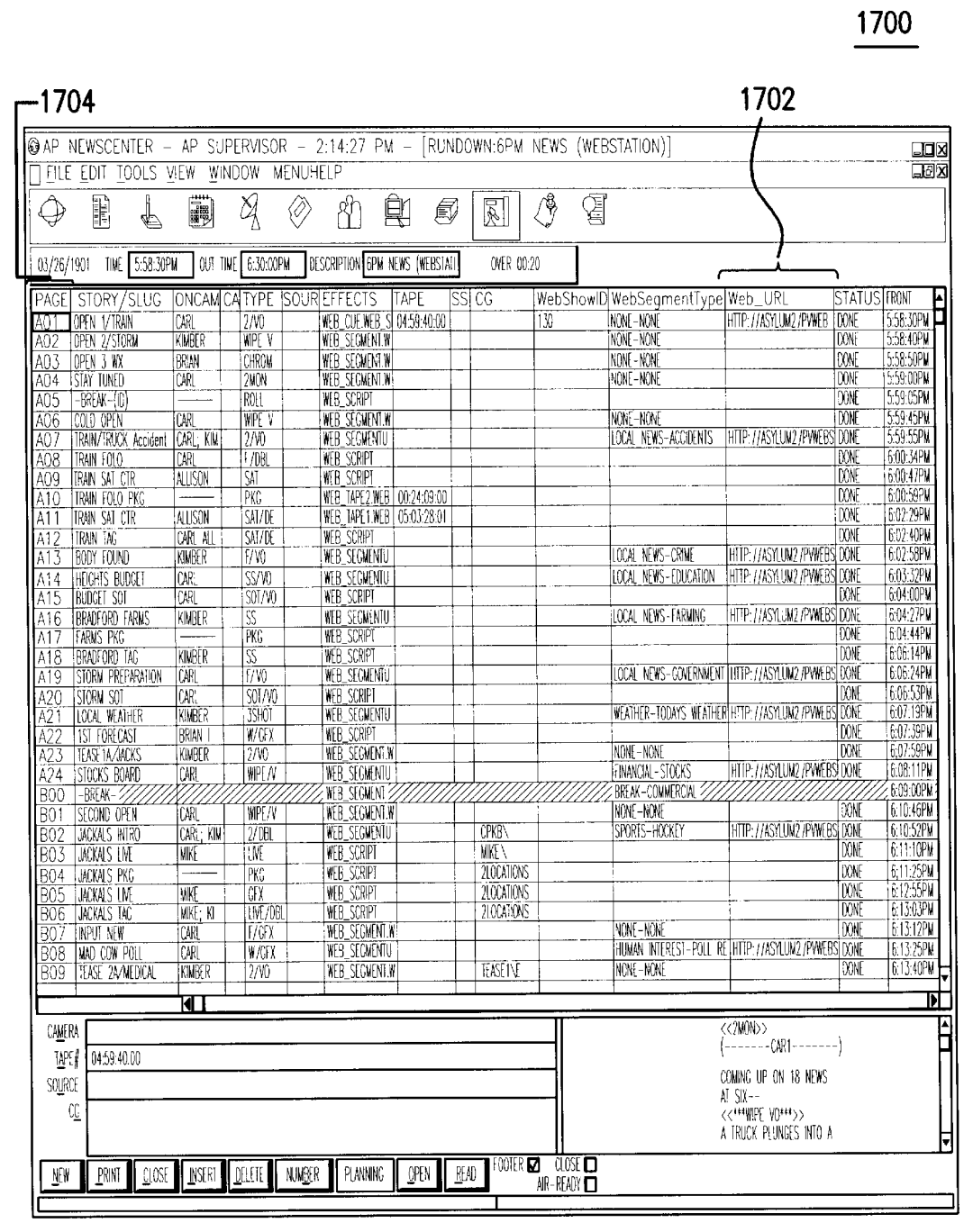

FIG. 17 illustrates a rundown GUI 1700 for a news automation system according to an embodiment of the present invention. Rundown GUI 1700 lists all of the show elements by line item. Page Column 1704 delineates a corresponding line-item designator for each element listed in rundown GUI 1700. Each element is typically assigned a line-item, alpha-numeric designator such as A01, A02, A03, etc. Additionally, a newscast is typically assembled in blocks known as A, B, C and D blocks in a half-hour show. Thus, the first character in the line-item designator is used to identify a specific block.

Rundown GUI 1700 also includes one or more WEB Link columns 1702 for associating media enhancements to an element. A director or producer would enter the URLs or like designator into WEB Link column 1702 by show element. For example, each element can be assigned a corresponding line-item, alpha-numeric designator such as A4, A3, and A5 (not shown) that may represent an "intro," "package," and "tag," respectively, for a story. The producer or other responsible party can enter URL(s) within Web Link column 1702 for line A5 which is the "tag" or the end of the story. After the show has been executed and transmitted to an online user, the URL(s) would be presented on the display for the enhanced media client 120 during the "tag" section of the story. The URL(s) would, therefore, guide the enhanced media client 120 user to, for example, an extended play segment of the story.

In an embodiment, rundown GUI 1700 is configured to be automatically converted into a set of computer readable broadcast instructions. In an embodiment, the set of broadcast instructions is created from the Transition Macro™ timeline-based application program as described in commonly assigned U.S. Pat. Ser. No. TBD (Attorney Docket No. 1752.0130001), filed Apr. 2, 2001, by Holtz et al., and entitled "Method, System and Computer Program Product for Full News Integration and Automation in a Real Time Video Production Environment" (herein referred to as "the '013 application"). The disclosure of the '013 application is incorporated herein by reference as though set forth in its entirety.

The present invention encompasses other methodologies or techniques for linking media enhancements. In another embodiment, media enhancements are entered in the script pertaining to a specific element. As discussed above, the present invention includes a teleprompting system (not shown) that permits an operator to enter various script commands. One type of script command is an enhanced media command that instructs a system component (such as, media production system 145 or media encoding system 140) to integrate media enhancements into a media production. As shown in FIG. 4 for example, auxiliary information, such as a URL reference or other identifier, can be embedded into a script that is sent to media encoding system 149 and viewable on text window 410.

Script integration of media enhancements improves the timing pace that auxiliary information is displayed on enhance media clients 120 because script integration is a real-time synchronous method to link objects with video when the talent is reading about the specific topic that the object references. For example, the talent may be reading a financial report about two separate companies. When discussing Company A performance, a graphic object with the companies stock or financial data can be displayed synchronized with the video. When Company B is discussed, the object changes to reflect Company B data. In this example, the director does not step into another segment to trigger an object, but the topic changes while the talent remains on the program output. In this application, script commands offer better control and synchronization.

In another embodiment, media enhancements are entered via an interactive time sheet such as GUI 400 shown in FIG. 4. As discussed, GUI 400 supports two methods for linking enhanced media to a media production. One method pertains to the placement of icons 406 (namely, data objects 804) onto control line 404p. As described in reference to FIG. 8, GUI 800 permits an operator to configure data object 804 to include various properties, including links to enhanced media. A reference field (not shown) is included in GUI 800 to permit an operator to enter a file identifier, URL data, or the like for the enhanced media.

In another embodiment, media enhancements are linked to a media production directly from a field provided on an interactive time sheet, such as GUI 400. As discussed with reference to FIG. 7, data control 710 is used to enter auxiliary information and link the information to a specific segment or an entire show. The auxiliary information is entered by typing the URL reference or other identifier in reference window 712 and activating data control 710.

IV. Viewer Interface

Figure 11:
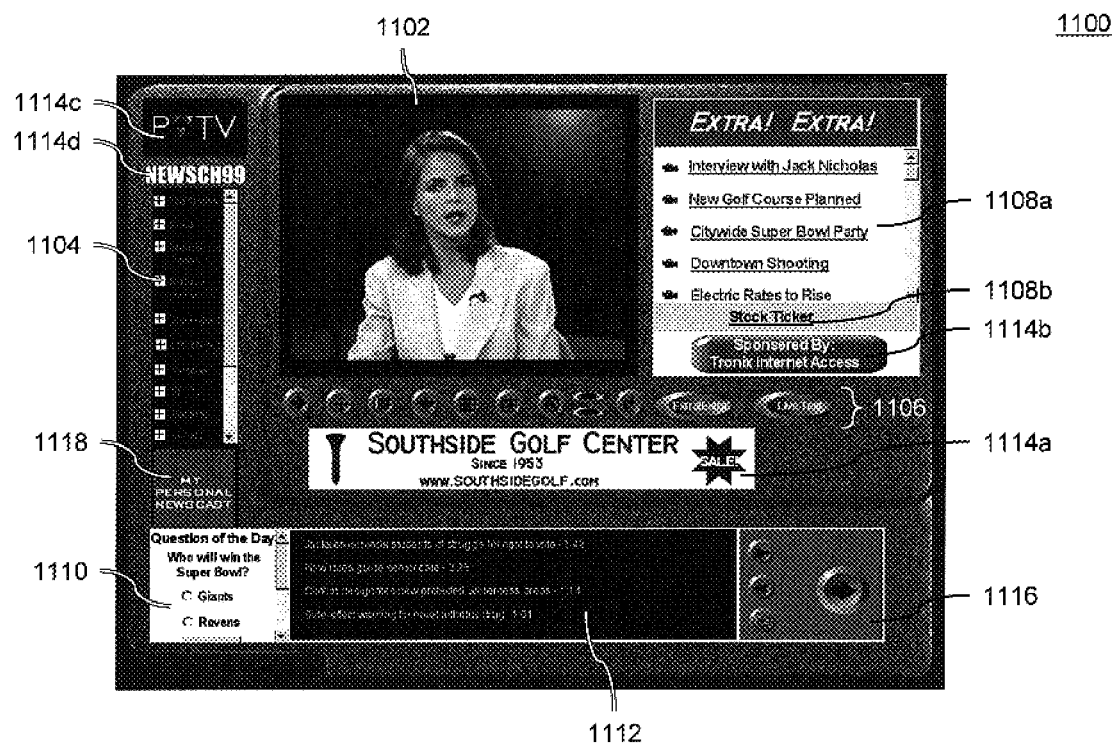
FIG. 11 illustrates an enhanced media streamer according to an embodiment of the present invention.

FIG. 11 illustrates streamer 1100 for use with an enhanced media server 120 according to an embodiment of the present invention. Streamer 1100 is a textual or graphical user interface that provides a common platform for integrating one or more of the following components: a media viewer 1102, media index 1104, viewer controls 1106, auxiliary media 1108a–1108b, opinion media 1110, media access area 1112, banners 1114a–1114d, media access controls 1116, and index button 1118. As illustrated, streamer 1100 is configured to display each component in the same frame or window. However, in another embodiment, one or more of the components are displayed in a separate frame or window.

Streamer 1100 is generated by an application operating on an enhanced media client 120. In an embodiment, enhanced media server 115 transmits an XML application to instruct a browser application operating on enhanced media client 120 to create the requisite components of streamer 1100. Other programming applications can be used as would be apparent to one skilled in the relevant art(s).

1. Media Viewer

Media viewer 1102 is responsive to user commands to display on-demand and live media productions. In an embodiment, media viewer 1102 is operable to demultiplex media streams to support picture-in-picture (PIP) functionality. Accordingly, media viewer 1102 is configurable to display multiple media productions in the same or a separate window.

In an embodiment, a user would initiate a session with enhanced media server 115, and assemble an on-demand multimedia presentation. The user has the option of requesting to watch a live presentation. If the user prefers to view a different show, the user can override the live presentation to view a previously aired show in its entirety or components of the show in the preferred arrangement.

Although media viewer 1102 is designed to display video, in an embodiment of the present invention, media viewer 1102 is configurable to only play audio without any video. This embodiment is used to support a radio broadcast as described above, or receive audio feeds from other web sites.

2. Viewer Controls

Viewer controls 1106 are responsive to user inputs to alter or control media viewer 1102. In an embodiment, viewer controls 1106 enable the content displayed by media viewer 1102 to be started, fast-forwarded, reversed, stopped or paused at any time. Moreover, an entire segment within a show can be advanced or skipped forward or backward as desired by the user. Other controls include captioning. For instance, the script containing the text of a newscast can be displayed by media viewer 1102 below or over the current video. The text can also be displayed in a separate area.

Viewer controls 1106 are also operable to support online recording, volume controls, parental locks, PIP functionality, viewer size, multiple languages, stereo sound, and the like. In an embodiment, viewer controls 1106 include an interrupt button (not shown). For example, if enhance media client 120 receives a breaking news update, streamer 1100 can be configured to signal the user. The user would have the option of activating viewer control 1106 to implement an interrupt to either watch the breaking news update immediately or save the news update to a file for future viewing. The interrupt button (not shown) for viewer control 1106 can also be used with a commercial advertisement. The user could activate the interrupt button (not shown) for viewer control 1106 to pause or save the commercial advertisement to a file for future viewing.

In an embodiment, viewer controls 1106 include preset buttons (not shown). The preset buttons (not shown) for viewer controls 1106 can be activated to receive transmissions from, for example, a favorite television or radio station.

3. Media Index

Media index 1104 displays a listing of available media productions that can be selected and displayed by media viewer 1102. In an embodiment, media index 1104 contains the rundown from a specific show, or a listing of all shows available from a hosting web site. In another embodiment, media index 1104 contains a personalized listing of shows identified by a user. In an embodiment, the user establishes a profile to specify shows by topics or category, specify duration for the entire media production, enable breaking news updates, specify a start time, designate a fixed or flexible end time, or the like. The profile can be saved for future use. Index button 1118 is used to toggle between a personalized listing and general listing in response to user input.

Media index 1104 supports keyword searches for content in the archival and retrieval system of system 100. In an embodiment, SQL queries are sent to enhanced media server 115, which queries IM server 130 for the requested content.

Media index 1104 permits users to save content as they wish for later requests or to build an archive of related stories for use in a report, thesis, or other interests.

4. Auxiliary Media

In an embodiment, streamer 1100 demultiplexes media streams from enhanced media server 115 to display auxiliary media 1108a–1108b. Auxiliary media 1108a includes extended media, caption data, graphics, and the like. Activating a viewer control 1106 (shown as "ExtraExtra" and "Live Text") permits one to switch between caption data and other auxiliary information. Auxiliary media 1108b, in a representative embodiment, is a hyperlink or hot button for a stock ticker or the like. The stock ticker can be supplied or sourced by the broadcaster and can be either a standards-based ticker or customized to only illustrate the symbols of choice by the user.

5. Opinion Media

In an embodiment, streamer 1100 demultiplexes media streams from enhanced media server 115 to display opinion media 1110. The online user may interact with streamer 1100 to participate in a poll, take a survey or review the opinions of other respondents.

6. Media Access Area

Streamer 1100 also includes a media access area 1112. In an embodiment, media access area 1112 is a web browsing region that permits the user to visit and view other web sites without leaving media viewer 1102 or interrupting a current show displayed by media viewer 1102. Hence, both windows are active such that media access area 1112 can be used to research information without having to leave media viewer 1102. This avoids time-consuming loading, buffering and reloading when the user wishes to go back to the in-progress program on media viewer 1102.

Media access area 1112 is also used as the browser for URL links that are activated from auxiliary media 1108a–1108b. In another embodiment, media access area 1112 displays an online user's rundown of the selections from media index 1104. The selections can be placed in any order or re-ordered are indicated by the user.

Media access controls 1116 permits the user to manipulate the selections displayed in media access area 1112. Media access controls 1116 includes a scroll buttons that instructs the media access area 1112 to caret up or down. Media access controls 1116 also includes a delete button for removing selections and a play button for sending a request to enhanced media server 115 for the selections.

Media access area 1112 is also configurable to permit users to submit questions to a Webmaster or network systems administrator for a broadcasting station or portal host. A user can also search a specific topic tied to a media production, such as a newscast. In an embodiment, each time a user selects a topic from the search results, advertisements linked to the topic are routed to the user. Streamer 1100 or enhanced media server 115 is also configurable to support monitoring and data logging to track web hits, advertisement hits, billing and costs. In an embodiment, streamer 110 or enhanced media server 115, supports communications with independent media measurement entities, such as, Nielson/Net-Ratings, Media Metrix and Arbitron for the development of independent industry reports.

7. Banner

Streamer 1100 also processes the media streams from enhanced media server 115 to display banners 1114a–1114d. Advertisement banner 1114a is a static or dynamic banner that promotes the goods or services of a sponsor. Advertisement banner 1114a can be active to require the user to scroll or click-through the banner, or passive to require no action on part of the user. In an embodiment, the sponsor can be linked to a specific segment displayed by media viewer 1102.

Advertisement banner 1114b is a sponsor button or mark linked to the media production. In an embodiment, advertisement banner 1114b is linked to a segment currently displayed by media viewer 1102 and advertisement banner 1114b is linked to the web page in general.

Advertisement banners 1114c–1114d are used to promote the hosting web site or portal. Advertisement banners 1114a–1114d can be a hot spot, hyperlink or nonfunctional.

8. Alternative Skins

Figure 12:
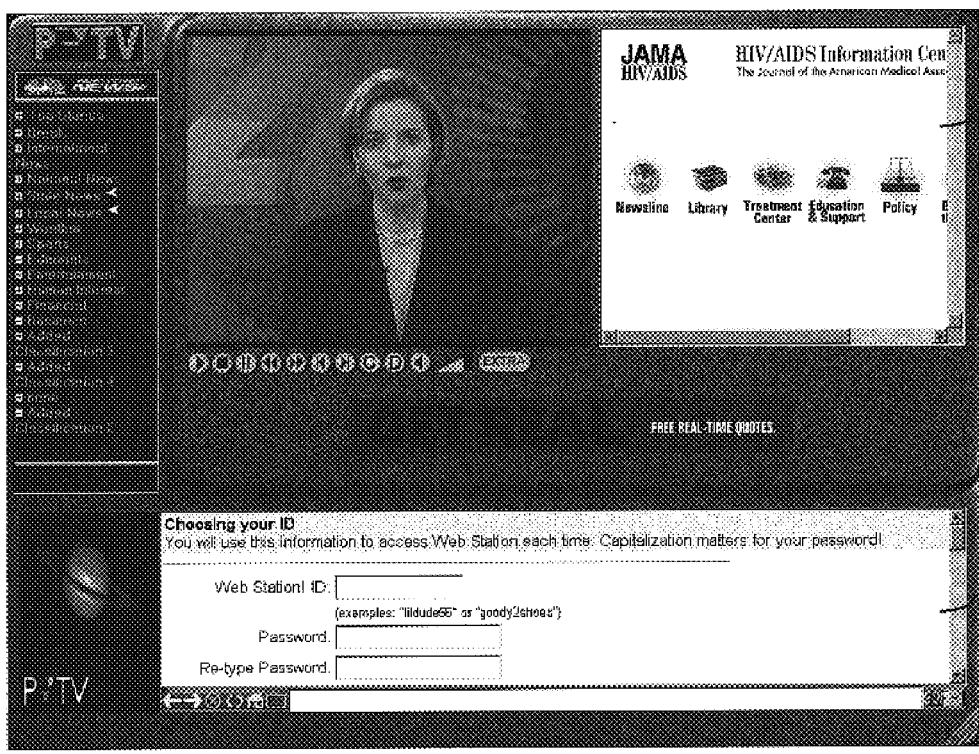
FIG. 12 illustrates an enhanced media streamer according to another embodiment of the present invention.

FIG. 12 illustrates another embodiment of a client GUI (shown as streamer 1200) for use with an enhanced media server 120. In streamer 1200, media access area 1112 provides a login menu that enables a user to access the content of enhanced media server 120. Auxiliary media 1108a displays an HTML page from a web site that is linked to the current media stream shown by media viewer 1102.

The above streamer embodiments have been described with reference to the hosting site being the actual broadcaster or content suppler. As such, the streamer components are implemented in the web site hosted by the local broadcaster. The present invention can also be implemented with a third party portal. For example, referring to FIG. 2, in an embodiment, managing server 215 in configurable to receive requests for media productions directly from enhance media clients 120a–120d. In this embodiment, managing server 215 would query the appropriate enhanced media server 115a–115b for the media production and for display on GUI designed for the host of managing server 215.

Figure 13:
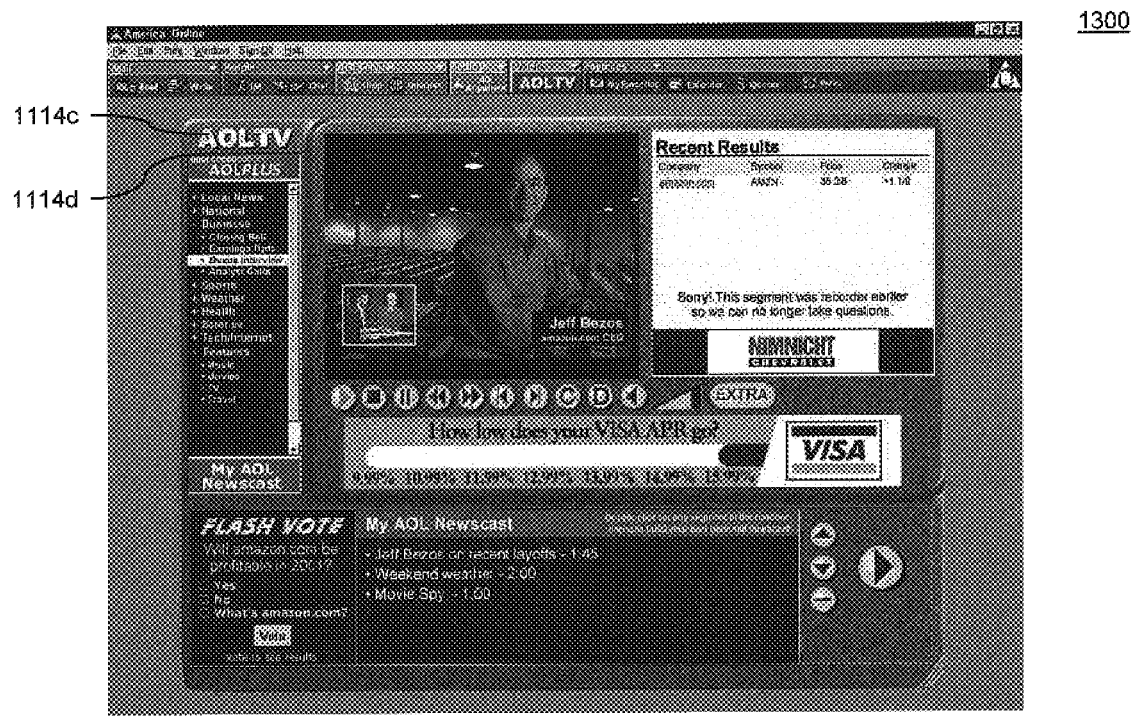
FIG. 13 illustrates an enhanced media streamer according to another embodiment of the present invention.

An embodiment of a third party GUI is shown in FIG. 13. Streamer 1300 permits the streamer components to be presented on a third party GUI with the third party host identified by advertisement banners 1114c–1114d.

V. Advertisement Revenue Generation

In an embodiment, advertisements are linked to the content routed to an online user. As discussed, the advertisement can take the form of a commercial, electronic banner or the like. The system and method of the present invention includes techniques for tracking and monitoring the advertisement transmitted to each user in addition to determining whether a user actually receives or views the advertisement. The metrics collected from this process can be used to generate and apportion advertisement revenues, as described in detail below.

The present invention supports sponsorship at multiple levels. Local sponsors purchase advertisements to be promoted within the geographical region of the webcast portal. National sponsors purchase advertisement options for promotions outside of the geographical region of the local webcast portal. National sponsorship, as used herein, is intended to include national as well as international promotions. Thus, the content can be integrated with local advertisements, national advertisements or a combination of both.

1. Download Metrics

In an embodiment, metrics are collected each time a user receives enhanced media content linked with advertisements. The metrics can include the number of downloads, page views, click-throughs, time of download, show links, and the like. The sponsor of the advertisement is invoiced in accordance with the metric, and the revenue generated from the invoice is apportioned accordingly.

2. Subscription Services

As discussed above, in an embodiment, the linked advertisement takes the form of an audio or video commercial. Some users may not be interested in viewing the audio or video commercial, or may desire to delay the broadcast until a future time. Accordingly, in an embodiment, the user has the option of delaying or skipping the commercial feed. The user can create a profile to exercise this option, or activate a viewer control 1106 as desired.

Since advertisement revenue typically cannot be generated if the user opts to forego the advertisement, the present invention is configured to overcome this scenario. In an embodiment, the sponsor of the commercial feed would advertise the product in an electronic banner that is linked to the content. Therefore, in place of a commercial, an electronic banner would promote the product in a window adjacent to and concurrent with the content stream.

In an embodiment, the user is charged a subscription fee to receive commercial-free content. The subscription fee is apportioned among the advertisements that are linked to the commercial-free feed. In an embodiment, the commercial-integrated services are free to the user with commercial-free services being provided at a fee. In another embodiment, the commercial-integrated services are also based on a subscription; however, the commercial-free services are provided at a premium rate.

3. Distribution Schemes

The method and system of the present invention is configurable to support multiple distribution schemes for advertisements. For instance, the advertisements can be generated and routed by a local webcast portal (such as enhanced media server 115), national webcast portal (such as managing server 215), or a network of multiple integrated-portals. Thus, in an embodiment, the advertisement content for AD IMS 170 can be supplied and managed by two protocols: one being implemented at a local level and the second being implemented at a national level.

3.1. Local Distribution

In an embodiment, a local distribution scheme is used to manage advertisements. At the local level, the advertising spots are sold and linked to media productions by the local media host. As such in an embodiment, enhanced media server 115 is a local Internet portal for targeted local and national advertisements. Specifically, the local host is responsible for the sale of advertising space to the local market. In an embodiment, the local host integrates advertisements only from local sponsors. In another embodiment, the local host also handles the sale of national advertising spots.

The content for the media production is provided by the local host, itself, or received from another traditional television station, major network, automated multimedia production environment, radio station, or the like, with or without advertisement links. The local host would integrate the advertisements from the advertising sponsor, and route the enhanced media production to the downstream user.

In an embodiment, system 100 is scalable to support a network of affiliated enhanced media servers 115, with each enhanced media server 115 being hosted by, for example, a local broadcasting station. A master database (not shown) can be used to manage national advertising over the entire network. The master database would synchronize each local AD IMS 170 to identify available spots for national advertising, schedule national advertising spots, archive national advertising spots, serve national advertising, and create reports from each local AD IMS 170 to account for all advertisements served both locally and nationally along with comprehensive metrics, accounts, and revenue generated to compile and account for revenue sharing allocations and invoicing requirements.

3.2. Regional Distribution

The second protocol for managing the distribution of advertisements is implemented at a national level. The term "national level" is intended to include all regions outside of a designated local region, which includes international advertising.

Under the national level protocol, in an embodiment, a local broadcaster manages the sale of advertising space to the local market. However, a national service provider (typically, an ISP or information service provider, such as AOL, Music Publishers, Yahoo, MSN, or the like, as discussed above) would operate managing server 215 (shown in FIG. 2) to promote a network of affiliated enhanced media servers 115, and sell advertising spots at the national level. In this embodiment, advertising administration system 265 maintains a master database for advertisement management that synchronizes each local AD IMS 170 to identify available spots, schedule national advertising spots, archive national advertising spots, serve national advertising, and manage each local AD IMS 170.

In an embodiment, the local hosts (operating enhanced media servers 115a–115b) would integrate advertisements from national sponsors with or without local sponsorship. In an embodiment, the content for the media production is provided by the local host, itself, or received from another traditional television station, major network, automated multimedia production environment, radio station, or the like, with or without advertisement links. The local host would integrate advertisements from a national sponsor and route it to the downstream user's enhanced media client 120.

3.3. E-Commerce

As described above in reference to the radio station option, the present invention is operable with e-commerce. In an embodiment, a radio-based webcast station can link and promote various merchandise with the audio or video broadcasts. For example, the radio-based webcast station can offer to sell a CD, DVD, clothing, posters and the like. The purchases can be made by credit card, electronic wallets, pre-established user accounts (e.g., with a subscription service), and the like.

In an embodiment, advertisements are linked to the e-commerce purchases and routed to a user in response to the user's making an inquiry or purchase. In another embodiment, user activity related to an inquiry or purchase is tracked and monitored. A report can be produced from this activity to record the number of downloads, purchases, amount of purchases, and the like. The report would enable the webcast portal to derive income from the supplier or promoter of the e-commerce item. The income can be based on a percentage of sale, number of downloads, or the like.

3.4. Education

In an embodiment, the present invention supports an education module that allows a broadcaster or another media hosting facility to facilitate lesson plans, testing, quizzing and reporting. The education module is preferably, but not necessarily, a media production tutorial system, such as the type described in commonly assigned U.S. Pat. Ser. No. TBD (Attorney Docket No. 1752.0140001), filed Apr. 12, 2001, by Holtz et al., and entitled "Interactive Tutorial Method, System and Computer Program Product for Real Time Media Production," (herein referred to as the "the '014 application"). The disclosure of the '014 application is incorporated herein by reference as though set forth in its entirety. As such, a media production tutorial system (not shown) would query enhanced media server 115 for media productions and related data to support the lesson planning, testing, quizzing and reporting functions of the tutorial system.

In an embodiment, enhanced media server 115 acts as a portal to the media production tutorial system (not shown). As such, the user of enhance media client 120 could activate an icon, for example, to send a request to the media production tutorial system (not shown) and register for an online course or purchase educational items, such as manuals, text books, video recordings, and the like.

The educational support functionality of the present invention permits broadcasters or other hosting facilities to license, sell airtime or produce media content to educational, corporate, government or other institutions for the purpose of online learning. In this embodiment, courses are illustrated on a rundown menu (such as, media index 1104 in FIG. 11) for user selection. In an embodiment, a user could purchase an online course or educational content with a credit card, electronic wallet, pre-established user account (e.g., with a subscription service), and the like. Enhanced media server 115 also supports course registrations and interacts with the media production tutorial system (not shown) to generate reports to assist a customer with student progress, material covered, test and quiz grades, as well as time of log-ins, number of log-ins, and duration to track a student's efforts accordingly. The education module of the present invention can be used by affiliate, independent, Public Broadcasting System (PBS) television stations or any other entity including radio stations, newspapers, webcasters, corporations, government or educational institutions of learning.

VI. Conclusion

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method of providing video content from a server to an end-user, comprising:
   recording a live presentation to create the video content;
   partitioning the video content simultaneously while recording the live presentation such that the video content comprises a plurality of video segments, wherein said partitioning classifies each of said plurality of video segments into at least one category, and wherein each of said plurality of video segments contain different subject matter of the video content;
   storing information representative of said partitioning in a database;
   selecting one or more of said plurality of video segments according to at least one user parameter, wherein said at least one user parameter relates to at least one category; and
   transmitting at least said selected video segments to the end-user.

2. The method of claim 1, further comprising establishing a template for specifying said at least one user parameter, wherein said template is configured by the end-user, wherein the step of selecting is based on said template.

3. The method of claim 1, wherein the step of selecting includes specifying said at least one user parameter according to inputs provided by the end-user.

4. The method of claim 1, further comprising storing a history of the prior selections of the end-user, wherein the step of selecting includes specifying said at least one user parameter according to said history.

5. The method of claim 1, further comprises assembling all of said selected video segments prior to the step of transmitting.

6. The method of claim 1, wherein the transmitting step streams at least one of said selected video segments upon receipt at the server.

7. The method of claim 1, wherein at least one of said selected video segments includes an advertisement.

8. The method of claim 7, wherein said advertisement is selected according to a metric associated with the end-user.

9. The method of claim 8, wherein said metric includes a demographic of the end-user.

10. The method of claim 8, wherein said metric includes a buying pattern of the end-user.

11. The method of claim 8, wherein said metric includes a past viewing history of the end-user.

12. The method of claim 7, wherein said advertisement is selected according to a metric associated with the content of said selected video segments.

13. The method of claim 7, further comprising billing an advertiser when said advertisement is displayed.

14. The method of claim 13, further comprising apportioning revenue generated from said advertisement displayed to the end-user, said apportioning being among at least two parties associated with the network and/or production of said plurality of video segments.

15. The method of claim 14, wherein said at least two parties include a television station.

16. The method of claim 14, wherein said at least two parties include an operator of a portal.

17. The method of claim 14, wherein said at least two parties include an Internet service provider.

18. The method of claim 14, wherein said at least two parties include an information service provider.

19. The method of claim 13, wherein the step of billing occurs when an end-user event is detected.

20. The method of claim 19, wherein said end-user event is a click-through of said advertisement or a page-view.

21. The method of claim 7, further comprising billing an advertiser according to an advertisement metric.

22. The method of claim 21, wherein said advertisement metric includes a time duration of said advertisement.

23. The method of claim 21, wherein said advertisement metric includes a file size of said advertisement.

24. The method of claim 21, wherein said advertisement metric includes a time of day when said advertisement is displayed.

25. The method of claim 21, wherein said advertisement metric relates to the content of said video segment.

26. The method of claim 21, wherein said advertisement metric includes a demographic of the end-user.

27. The method of claim 21, wherein said advertisement metric includes a rating of said video segment.

28. The method of claim 1, wherein said selected video segments are transmitted over the Internet.

29. The method of claim 1, wherein said selected video segments are transmitted via a network that includes a communication infrastructure.

30. The method of claim 1, wherein said selected video segments are a news program.

31. The method of claim 1, wherein at least one of said selected video segments includes auxiliary information.

32. The method of claim 1, wherein at least one of said selected video segments includes extended media.

33. The method of claim 1, wherein at least one of said selected video segments includes a hyperlink to a related site.

34. The method of claim 1, further comprising the step of enabling display of said selected video segments using a viewer interface.

35. The method of claim 34, wherein said viewer interface includes a media viewer, a media index, a viewer control, an auxiliary media, an opinion media, a media access area, a banner, a media access control, and/or an index button.

36. The method of claim 1, further comprising the step of archiving said plurality of video segments in a second database from a plurality of sources.

37. The method of claim 36, wherein said second database is distributed throughout the network.

38. The method of claim 36, wherein said second database is centralized in the network.

39. The method of claim 1, wherein the steps of partitioning and storing are performed by a production automation system.

40. The method of claim 1, wherein the steps of partitioning and storing are performed automatically.

41. The method of claim 1, wherein the steps of partitioning and storing are performed using automated media production.

42. The method of claim 1, wherein the steps of partitioning and storing are performed using manual media production.

43. The method of claim 1, further comprising capturing information concerning the end-user.

44. The method of claim 43, wherein said information is used to develop a profile of the end-user.

45. The method of claim 44, wherein said user parameter is defined according to said profile.

46. The method of claim 44, wherein said selected video segments are scheduled according to said profile.

47. The method of claim 44, further comprising transmitting an advertisement according to said profile.

48. The method of claim 7, wherein said advertisement is priced based on over-the-air broadcast criteria.

49. A system for providing video content from a server to an end-user, comprising:
   means for recording a live presentation to create the video content;
   means for partitioning the video content simultaneously while recording the live presentation to create the video content into a plurality of video segments, wherein said partitioning classifies each of said plurality of video segments into at least one category, and wherein each of said plurality of video segments contain different subject matter of the video content;
   means for storing said at least one category in a database;
   means for selecting one or more of said plurality of video segments according to at least one user parameter, wherein said at least one user parameter relates to at least one category; and
   means for transmitting at least said selected video segments to the end-user.

50. The system of claim 49, further comprising means for establishing a template for specifying said at least one user parameter, wherein said template is configured by the end-user, wherein the means for selecting is based on said template.

51. The system of claim 49, wherein the means for selecting involves specifying said at least one user parameter according to inputs provided by the end-user.

52. The system of claim 49, further comprising means for storing a history of the prior selections of the end-user, wherein the means for selecting includes specifying said at least one user parameter according to said history.

53. The system of claim 49, further comprises means for assembling all of said selected video segments.

54. The system of claim 49, wherein the means for transmitting streams at least one of said selected video segments upon receipt at the server.

55. The system of claim 49, wherein at least one of said selected video segments includes an advertisement.

56. The system of claim 55, wherein said advertisement is selected according to a metric associated with the end-user.

57. The system of claim 56, wherein said metric includes a demographic of the end-user.

58. The system of claim 56, wherein said metric includes a buying pattern of the end-user.

59. The system of claim 56, wherein said metric includes a past viewing history of the end-user.

60. The system of claim 56, wherein said advertisement is selected according to a metric associated with the content of said selected video segments.

61. The system of claim 56, wherein comprising means for billing an advertiser when said advertisement is displayed.

62. The system of claim 61, further comprising means for apportioning revenue generated from said advertisement displayed to the end-user, said apportioning means being among at least two parties associated with the network and/or production of said plurality of video segments.

63. The system of claim 62, wherein said at least two parties include a television station.

64. The system of claim 62, wherein said at least two parties include an operator of a portal.

65. The system of claim 62, wherein said at least two parties include an Internet service provider.

66. The system of claim 62, wherein said at least two parties include an information service provider.

67. The system of claim 61, wherein the means for billing activates when an end-user event is detected.

68. The system of claim 67, wherein said end-user event is a click-through of said advertisement or a page-view.

69. The system of claim 55, further comprising means for billing an advertiser according to an advertisement metric.

70. The system of claim 69, wherein said advertisement metric includes a time duration of said advertisement.

71. The system of claim 69, wherein said advertisement metric includes a file size of said advertisement.

72. The system of claim 69, wherein said advertisement metric includes a time of day when said advertisement is displayed.

73. The system of claim 69, wherein said advertisement metric relates to the content of said video segment.

74. The system of claim 69, wherein said advertisement metric includes a demographic of the end-user.

75. The system of claim 69, wherein said advertisement metric includes a rating of said video segment.

76. The system of claim 49, wherein said selected video segments are transmitted over the Internet.

77. The system of claim 49, wherein said selected video segments are transmitted via a network that includes a communication infrastructure.

78. The system of claim 49, wherein said selected video segments are a news program.

79. The system of claim 49, wherein at least one of said selected video segments includes auxiliary information.

80. The system of claim 49, wherein at least one of said selected video segments includes extended media.

81. The system of claim 49, wherein at least one of said selected video segments includes a hyperlink to a related site.

82. The system of claim 49, further comprising means for enabling display of said selected video segments using a viewer interface.

83. The system of claim 82, wherein said viewer interface includes a media viewer, a media index, a viewer control, an auxiliary media, an opinion media, a media access area, a banner, a media access control, and/or an index button.

84. The system of claim 49, further comprising means for archiving said plurality of video segments in a second database from a plurality of sources.

85. The system of claim 84, wherein said second database is distributed throughout the network.

86. The system of claim 84, wherein said second database is centralized in the network.

87. The system of claim 49, wherein the means for partitioning and storing are comprised of a production automation system.

88. The system of claim 49, wherein the means for partitioning and storing operate automatically.

89. The system of claim 49, wherein the means for partitioning and storing operate using automated media production.

90. The system of claim 49, wherein the means for partitioning and storing operate using manual media production.

91. The system of claim 49, further comprising means for capturing information concerning the end-user.

92. The system of claim 91, wherein said information is used to develop a profile of the end-user.

93. The system of claim 92, wherein said user parameter is defined according to said profile.

94. The system of claim 92, said selected video segments are scheduled according to said profile.

95. The system of claim 92, further comprising means for transmitting an advertisement according to said profile.

96. The system of claim 55, wherein said advertisement is priced based on broadcast criteria.

* * * * *